United States Patent [19]

Stuart et al.

[11] Patent Number: 5,338,917
[45] Date of Patent: Aug. 16, 1994

[54] ERGONOMIC WELDING GUN WITH QUICK DISCONNECT CABLE ASSEMBLY

[75] Inventors: Kyle H. Stuart; Dale R. Bervig, both of Wichita, Kans.

[73] Assignee: Tweco Products, Inc., Wichita, Kans.

[21] Appl. No.: 843,322

[22] Filed: Feb. 26, 1992

[51] Int. Cl.$^5$ ............................................. B23K 9/173
[52] U.S. Cl. .......................... 219/137.63; 219/137.51; 219/137.61
[58] Field of Search ........... 219/137.2, 137.31, 137.51, 219/137.61, 137.62, 137.63

[56] References Cited

U.S. PATENT DOCUMENTS

| | | | |
|---|---|---|---|
| 1,853,609 | 4/1932 | Goodspeed | 219/137.51 |
| 2,797,301 | 6/1957 | Copleston | 219/75 |
| 3,249,734 | 5/1966 | Meyer | 219/137.61 |
| 3,283,121 | 11/1965 | Bernard | 219/130 |
| 3,428,778 | 2/1969 | Blackman | 219/130 |
| 3,433,925 | 3/1969 | Benfield | 219/137.63 |
| 3,514,570 | 5/1970 | Bernard | 219/130 |
| 3,544,758 | 12/1970 | dal Molin | 219/130 |
| 3,689,733 | 9/1972 | Matasovic | 219/130 |
| 3,909,585 | 9/1975 | Sanders | 219/130 |
| 4,250,366 | 2/1981 | Erickson | 208/157 |
| 4,268,740 | 5/1981 | Sanders | 219/137 |
| 4,282,419 | 8/1981 | Auer | 219/137 |
| 4,297,561 | 10/1981 | Townsend | 219/137 |
| 4,361,747 | 11/1983 | Torrani | 219/75 |
| 4,544,827 | 10/1985 | Cusick, III | 219/137 |
| 4,549,068 | 10/1985 | Kensrue | 219/137.63 |
| 4,554,432 | 11/1985 | Raloff | 219/137 |
| 4,560,858 | 12/1986 | Manning | 219/137 |
| 4,695,702 | 9/1987 | Gartland | 219/137 |
| 4,702,539 | 10/1987 | Cusick, III | 439/588 |
| 4,791,266 | 12/1988 | Gerard | 219/121 |
| 4,864,099 | 9/1989 | Cusick, III | 219/137 |
| 4,937,428 | 6/1990 | Yoshwaka | 219/137 |
| 5,132,513 | 7/1992 | Ingwersen et al. | 219/137.31 |

OTHER PUBLICATIONS

Tweco Catalog entitled "TIG" Torches and Accessories, Catalog No. T16-90 Dated Apr. 15, 1990.
Tweco D-size drawing "Tweco Flex Neck TIG Torch".
Welding Design & Fabrication Magazine, p. 12, Dated Jan. 1992.
Tweco advertising Brochure, "Tweco No. 1 MIG Guns" p. 2, Catalog No. 1MG-84 dated Jan. 1984.
Tweco D-size drawing "Tweco No. 1 MIG Gun".
Tweco advertising brochure entitled "Tweco Water-Cooled-MIG Guns", p. 2, Catalog No. WC-88, dated Jan., 1988.
Tweco D-size drawing "Tweco Water Cooled MIG Gun".
Tweco advertising brochure entitled "Tweco Mini MIG Guns" Catalog No. MMG-84 dated Jan., 1984.
Tweco D-size drawing "Tweco Mini-MIG with Flexible Conductor Tube".
Tweco drawing of heavier duty flexible conductor tube.
Bernard advertising brochure entitled "The Bernard E-Z Feed—Team is Ready for Production".
Hobart advertising brochure No. J-27823.

(List continued on next page.)

Primary Examiner—Clifford C. Shaw
Attorney, Agent, or Firm—Herzog, Crebs & McGhee

[57] ABSTRACT

The present invention includes several features which can be used alone or in combination. The three (3) primary features are: 1) an ergonomically designed welding gun; 2) a quick disconnect cable assembly, and 3) an improved contact tip and diffuser.

The ergonomic design for the welding gun includes one or more of the following features: a) the conductor tube can be rotated 360° about the centerline of the handle by the welder without resort to tools or disassembly of the gun; b) the conductor tube can be articulated 15° up or down, side to side, without resort to tools or disassembly of the gun; c) the rear portion of the handle includes a gentle curve of approximately 10° off the centerline to facility gripping by the operator; d) the handle operator to actuate the gun while gripping same either at the rear portion of the handle of the front portion of the handle.

12 Claims, 17 Drawing Sheets

OTHER PUBLICATIONS

Tweco D-size drawing "Tweco MIG Quick Rear Case".

Tweco D-size drawing "Tweco Rear Connection Assembly".

Tregaskiss advertising brochure entitled "Semi Automatic Air Cooled MIG Guns" dated 1990.

Bernard advertising brochure entitled "Bernard's Guide to Welding Guns" No. B/G 967-20, dated 1967.

Article entitled "Ergonomics Will Take Center Stage During '90's and into New Century", by Marilyn Joyce, dated Jan. 1991.

Article entitled "Use of Vibration Testing in the Early Evaluation of Workers with Carpal Tunnel Syndrome", by Thomas C. Jetzer, M.D., MPH, Journal of Occupational Medicine. vol. 33 No. 2 dated Feb., 1991.

Article entitled "What Are Cumulative Trauma Disorders?" by Margaret L. Bleecker, M.D., Ph.D., Journal of Occupational Medicine, vol. 33 No. 5 dated May, 1991.

Article entitled "Median Nerve Latencies in Poultry Processing Workers: An Approach to Resolving the Role of Industrial Cummulative Trauma in the Development of Carpal Tunnel Syndrome", by John R. Schottland, M.D., Journal of Occupational Medicine, vol. 33 No. 5, May, 1991.

Article entitled "Cumulative Trauma Disorders of the Upper Extremity, A Preventive Strategy is Needed", by Barbara A. Silverstein, Ph.D., MPH and Lawrence J. Fine, M.D., DrPh., Journal of Occupational Medicine, vol. 33 No. 5 May, 1991.

Article entitled "Most Factors Contributing to CTS Can Be Minimized, If Not Eliminated" Shirley Morgan, EdD., MSEA, MPH, Occupational Health & Safety, p. 47, Oct., 1991.

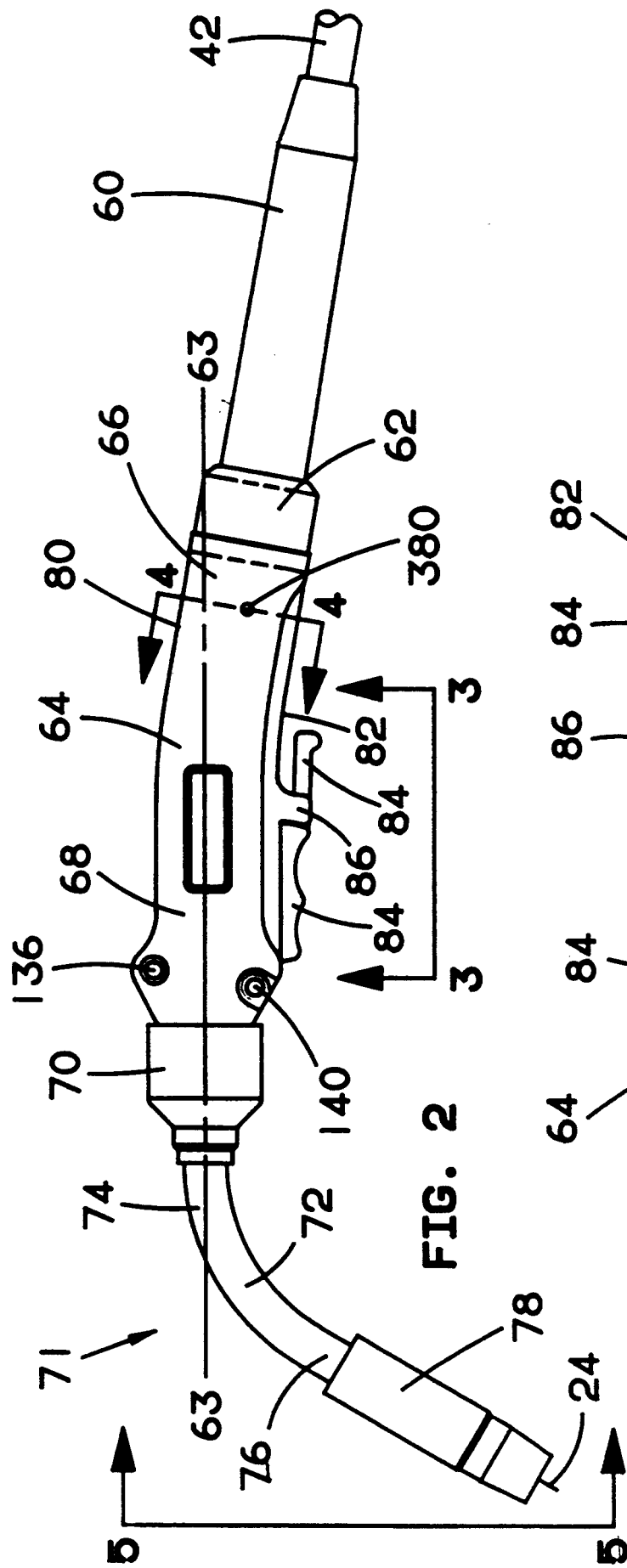
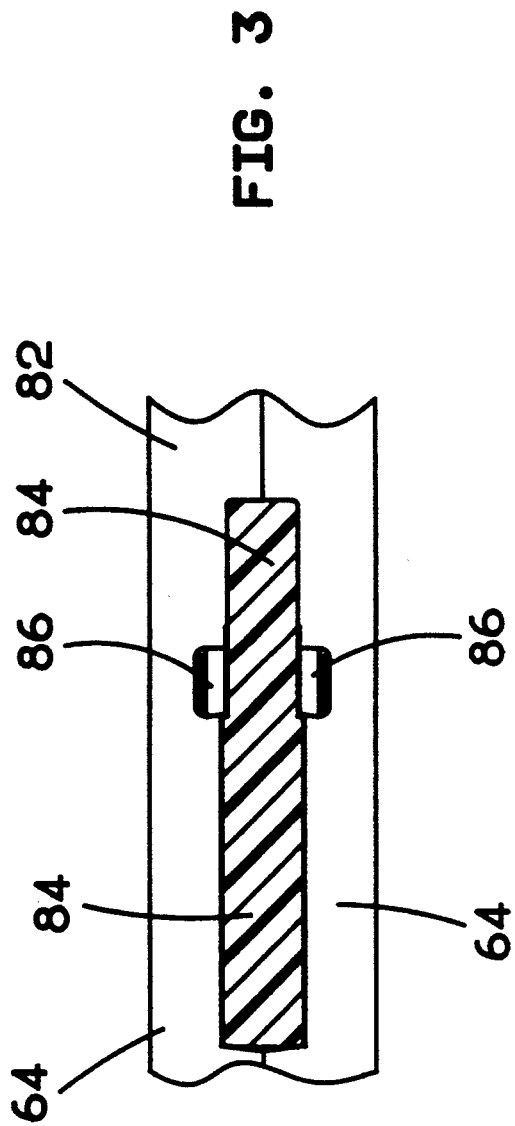
FIG. 2
FIG. 3

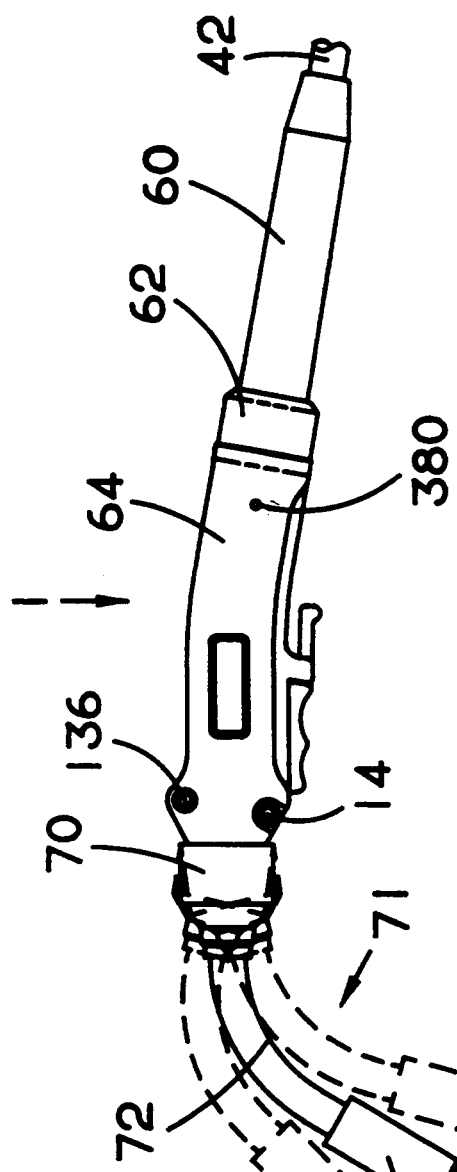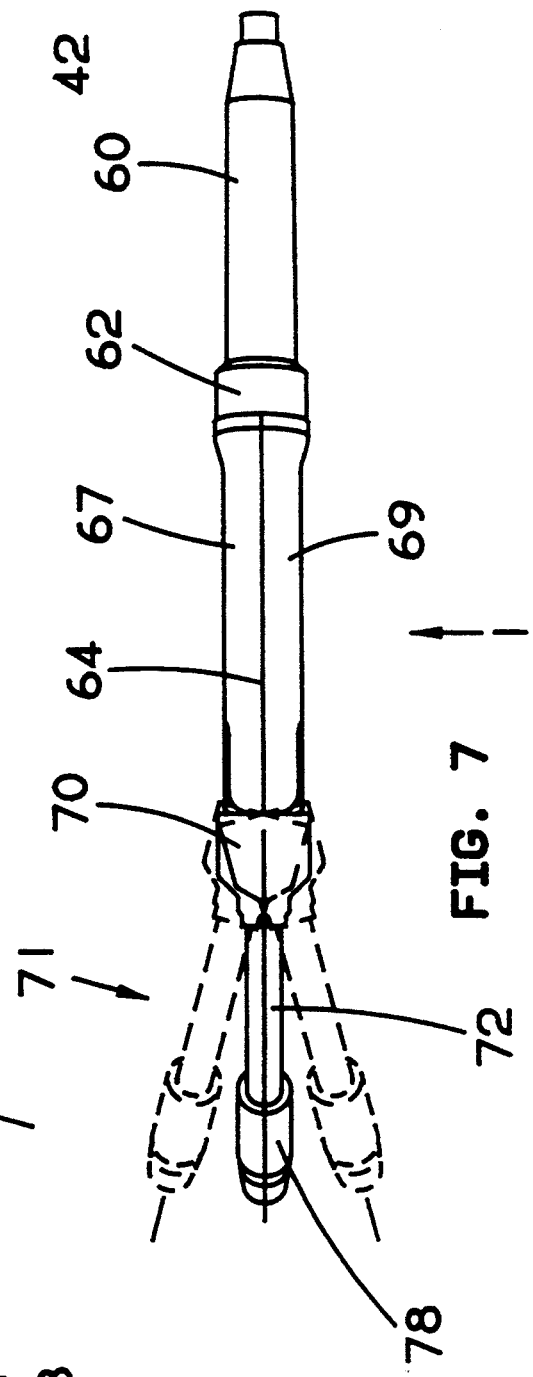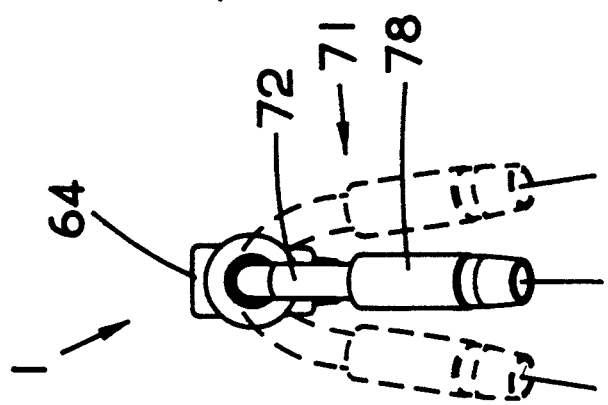

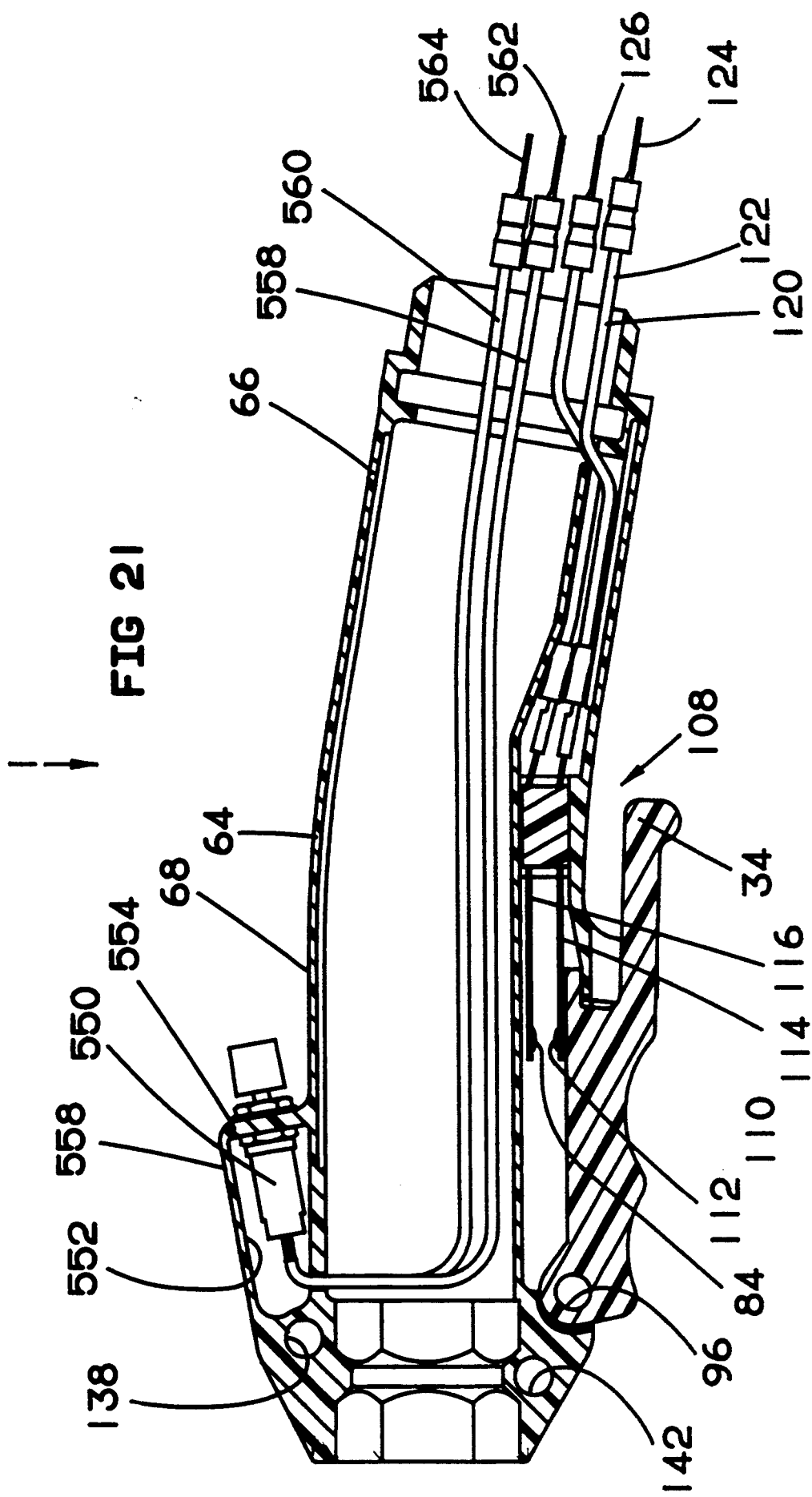

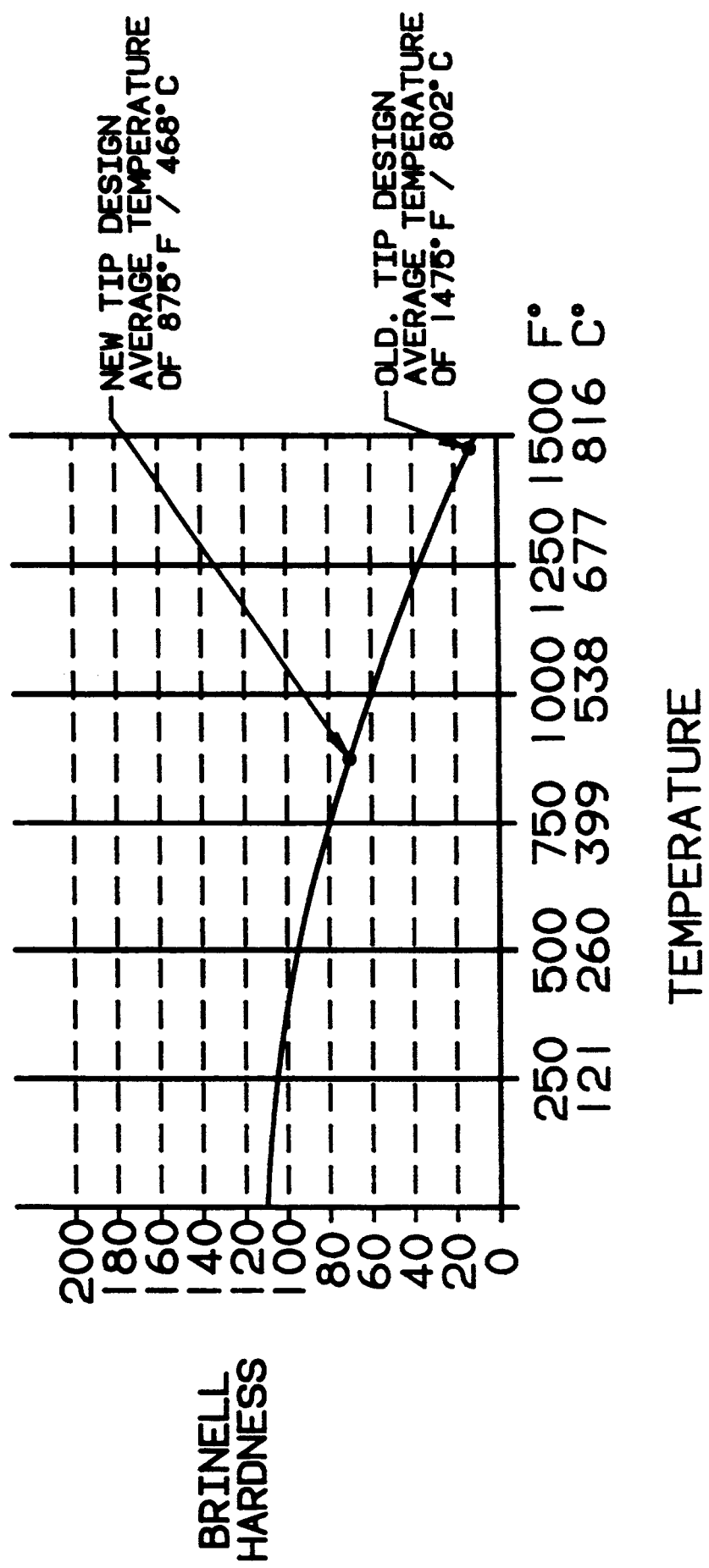

ERGONOMIC WELDING GUN WITH QUICK DISCONNECT CABLE ASSEMBLY

BACKGROUND OF THE INVENTION

1. Field of the Invention

The ergonomically designed welding gun with quick disconnect coaxial cable assembly is for use in gas metal arc welding (GMAW) which is commonly referred to in the industry as "MIG" type welding. The term MIG stands for metal inert gas. The welding wire in a MIG system is typically protected from atmospheric contamination by a blanket of shield gas which is inert or a combination of inert plus other gases. MIG welding systems utilize continuous welding wire which is rolled on a spool and fed through the coaxial welding cable to the welding gun. Because of the continuous welding wire, MIG welding systems are generally faster than TIG (tungsten inert gas) systems or conventional stick welding systems which utilize individual welding rods.

2. Description of the Prior Art

MIG welding systems have been widely used in the United States and other places around the world since at least the 1960's. The present invention is an improvement over these conventional MIG welding systems. The present invention includes three primary features which can be used either in combination or alone, including a) an ergonomically designed welding gun, b) a quick disconnect coaxial cable assembly and c) an improved contact tip and gas diffuser.

An Information Disclosure Statement has been filed concurrently herewith and includes an extensive discussion of the prior art. Some of the individual features of the present invention can be found in the prior art. For example, welding guns with curved handles are well known. However, Applicants believe that some of the individual features are also unique. To Applicants knowledge, this is the first MIG welding system to combine in one apparatus, the three primary features discussed above.

There has been a long felt need in the welding industry to develop systems which will reduce welder fatigue and at the same time will stand up to heavy commercial use. The present invention, which is believed to be exceptionally durable, is also designed to help reduce worker fatigue and to help reduce the risk of cumulative trauma disorders.

The coaxial cable used in conventional MIG welding systems is sometimes 10–15 feet long (3–5 meters). This cable runs from the rear connector at the power source to the welding gun. This cable usually wears out first on the end nearest the welding gun. When this occurs, an operator typically will cut the cable back one or two feet (0.3 meters) and reattach the welding gun to the truncated length of coaxial cable. This is rather time consuming, because it generally requires complete disassembly of the welding gun to reconnect the cable. The present quick disconnect cable assembly allows an operator to switch the ends of the cable without complete disassembly of the gun or rear connector, which is believed to be a faster procedure than the current cut and reattach method. As an added benefit, the overall length of the coaxial cable remains the same.

There has been a long felt need in the industry to help reduce the large inventory of different size welding guns commonly carried by welding supply distributors. Use of the unitary handle design in the present invention should help welding supply distributors reduce current inventory levels. It is common to offer MIG welding guns with several different amperage ratings. For example, it is contemplated that the present invention will initially be offered in 250 amps., 450 amps., and 600 amps. Using prior art devices, it was common for a welding supply distributor to keep a complete inventory of each different size of welding gun, including the cable and rear connector. The present invention utilizes a different approach based on a unique unitary handle design. The unitary handle disclosed herein can be used on either the 250 amp., the 450 amp. or the 600 amp. model. The size of the conductor tube assembly, of necessity, varies with the amperage as does the size of the cable assembly and rear connector.

There has been a long felt need to increase the life of MIG type contact tips in the welding industry. Those skilled in the art will recognize that welding produces a lot of heat. In order to melt the welding wire, the arc point will sometimes reach 10,000° F. or more (5,000° C.). The molten pool of metal beneath the arc, though cooler, may sometimes reach 5,000° F. or more (2,760° C.). The contact tip which is typically less than one inch (2.5 cm) away from the arc point may operate at temperatures of approximately 1500° F. (815° C.). Contact tips are typically formed from copper alloys which are adversely effected by high temperatures. Contact tips are also subject to wear because the welding wire feeds through the interior thereof. Contact tips tend to wear out relatively quickly and therefore are replaced many times during the life of a MIG welding gun. Because the tips are replaced so often they are referred to as "consumables" in the industry. The present invention allows the new contact tip to operate at substantially cooler temperatures which is believed to lengthen the overall life of the tip; however, it will still need to be replaced, though not as often.

SUMMARY OF THE INVENTION

The present invention includes several features which can be used alone or in combination. The three primary features are a) an ergonomically designed welding gun, b) a quick disconnect cable assembly, and c) an improved contact tip and diffuser.

The present invention includes an ergonomically designed welding gun which includes one or more of the following features: 1) the conductor tube can be rotated 360° about the centerline axis of the handle by the welder without resort to tools or disassembly of the gun, 2) the conductor tube can be articulated 15° up or down, side to side, by the welder without resort to tools or disassembly of the gun, 3) the rear portion of the handle includes a gentle curve of approximately 10° off the centerline to facilitate gripping by the operator, 4) the handle has an oval shaped upper surface and a protruding rectangular shaped lower surface to facilitate gripping by the operator, and 5) the welding gun includes an elongate trigger which allows the operator to actuate the gun while gripping either at the rear portion of the handle or at the front portion of the handle.

The coaxial welding cable includes a first cable connector assembly on one end and a second cable connector assembly on the other end, both of which are substantially the same and can be interchanged with either the welding gun or the rear connector. The interchangeability of these connectors allows the cable to be switched from end to end as may be required due to excess wear which normally occurs first, near the welding gun.

The contact tip and diffuser are believed to be more massive than prior art designs. The larger size contributes to more efficient transmission of electricity and dissipation of heat. The contact tip and diffuser are believed to have a larger contact area than prior art devices which also allows for more efficient transmission of electricity and dissipation of heat. The present invention makes contact between the diffuser and the tip at three points as follows: 1) along a circumferential shoulder formed on the contact tip, 2) at a point between the protrusion in the diffuser and the channel in the contact tip, and 3) on a line opposite the protrusion. If a contact tip can be operated at cooler temperatures, it should result in longer life for the contact tip and the gas diffuser. Longer tip life means less downtime.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

FIG. 2 is a side elevation view of the ergonomic welding gun showing the strain relief and a portion of the welding cable.

FIG. 3 is a partial bottom plan view of the welding gun along the line 3—3 of FIG. 2 showing an enlargement of the trigger.

FIG. 4 is approximately to scale.

FIG. 5 shows in phantom, the ability of the conductor tube assembly to rotate 360° about the longitudinal axis of the welding gun.

FIG. 6 is a side elevation view of the welding gun. This figure shows, in phantom, the ability of the conductor tube assembly to articulate 15° up and down.

FIG. 7 is a top plan view of the welding gun. This figure shows, in phantom, the ability of the conductor tube assembly to articulate 15° side to side.

FIG. 8 is a front elevation view of the welding gun and the conductor tube assembly. This figure shows, in phantom, the ability of the conductor tube assembly to articulate 15° to the left and to the right.

FIG. 12A is a section view of the first cable connector, along the line 12—12 of FIG. 13.

FIG. 21 is a section view of an alternative embodiment of the handle assembly which includes an auxiliary switch on the top of the handle.

FIG. 22 is a graph which shows the relative hardness of a copper alloy at various temperatures.

DESCRIPTION OF THE PREFERRED EMBODIMENT

Figure 1:
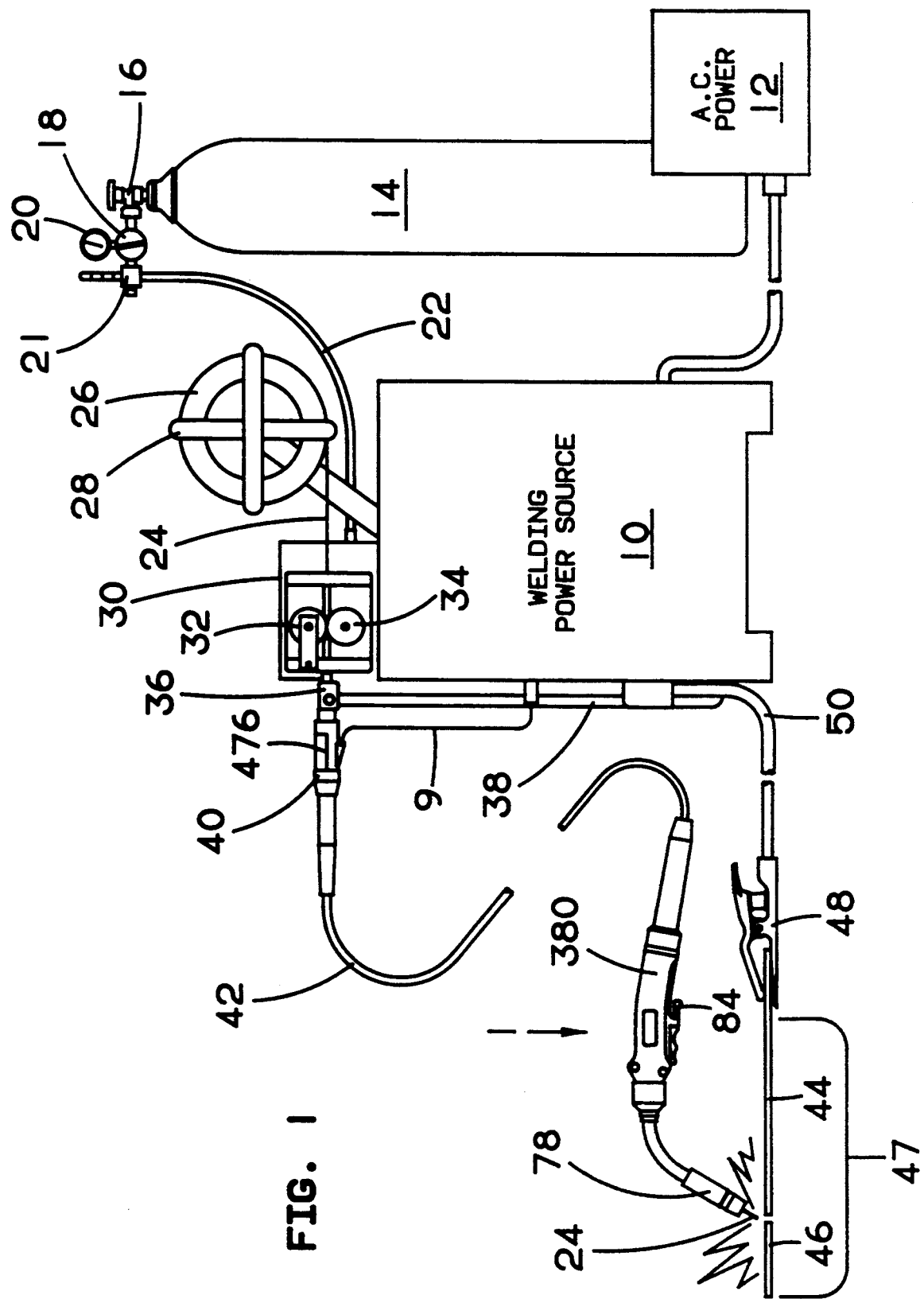
FIG. 1 is a diagrammatic sketch of a MIG welding system including the ergonomic welding gun with quick disconnect cable assembly.

Referring to FIG. 1, the ergonomic welding gun is generally identified by the numeral 1. The primary components of a MIG welding system which are well known to those skilled in the art, are shown in this figure. The welding power source 10 connects to an AC power supply 12 which is shown diagrammatically. In most industrial situations (in the United States), the AC power supply will either be 220 volts or 440 volts.

Also connected to the welding power source 10 is a high pressure gas cylinder 14 which typically contains an inert gas such as argon or perhaps a combination of argon and carbon dioxide. A shut-off valve 16 is attached to the high pressure cylinder 14. A regulator 18 is connected via piping to the valve 16 and typically reduces the pressure of the inert gas downstream from the regulator 18 to approximately 30 psi. A pressure gauge 20 provides a visual display of the gas pressure in the cylinder 14. A high pressure hose 22 provides fluid communication for the inert gas to the welding power source 10. The flow meter 21 is in fluid communication with the regulator 18 and the high pressure hose 22. In a typical MIG system, the inert gas flows at approximately 20 to 60 cubic feet per hour (560-1700 liters per hour).

The welding wire 24 is coiled on a spool 26. The welding wire 24 can be a copper coated ferrous wire, a stainless steel wire, a flux cored wire, etc. The spool 26 is mounted on a reel 28 which is typically positioned on top of the welding power source 10. The welding wire feeder assembly 30 advances the welding wire from the spool 26 to the welding gun 1.

The welding wire feeder assembly 30 includes two or more rollers 32 and 34 which grip the welding wire 24 and mechanically advance it from the spool 26 to the welding gun 1. An adapter 36 connects to the welding wire feed assembly 30. An electrical cable 38 runs from the welding power source 10 to the adapter 36. A rear connector 40 engages the adapter 36. In some situations, an adapter 36 is not required and the rear connector plugs directly in to the welding wire feeder assembly 30 and receives electrical power therefrom.

Control wires 9 are releasably connected on one end to the rear connector 40 and on the other end to the welding power source 10 or to the wire feeder assembly 30. The trigger 84 on the welding gun 1 actuates the welding power source 10 by closing the control circuit. Control wires run from the trigger 84 along the welding cable 42 to the control wires 9 which connect to the welding power source 10.

The coaxial welding cable 42 connects on one end to the rear connector 40 and on the other end to the welding gun 1. In this example, the workpiece 47 consists of a first plate 44 and a second plate 46 which are being welded together. A ground clamp 48 is attached to the workpiece 47 to complete the electrical circuit. A cable 50 electrically connects the welding power source 10 with the ground clamp 48.

In a typical MIG system, the workpiece is negative and the welding wire 24 is positive. The electrical circuit for a typical MIG welding system is completed as follows: The welding power source 10 connects to a cable 50 at the end of which is the ground clamp 48. The ground clamp 48 is manually attached by the welder to the workpiece 47. An electrical arc is created between the workpiece 47 and the welding wire 24 which causes the welding wire to melt into a molten pool thus joining the plates 44 and 46. The electrical current is transferred to the welding wire 24 through the contact tip 506, not shown in this figure, but discussed in greater detail hereinafter. The electrical current is transferred to the MIG welding gun 1, through the copper stranding 151 in the coaxial welding cable 42 to the rear connector 40. The rear connector 40 engages the adapter 36 which is connected via the cable 38 to the welding power source to complete the electrical circuit.

The welding power source 10 will typically provide DC current to the adapter 36 which is eventually transferred to the welding gun 1. Prior to beginning a project, the operator will typically adjust voltage as determined by the workpiece and the size of the welding wire. The operator will also adjust the amperage based on the rate of welding wire feed and the size of the workpiece. The voltage controls and the amperage controls for the welding power source 10 are not shown in the drawing but are well known to those skilled in the art.

FIG. 2 is a side elevation view of the MIG welding gun 1. The coaxial welding cable 42 feeds into the strain relief 60 which is connected by the sleeve 62 to the handle 64 of the welding gun 1. The centerline of the handle 64 is designated by the line 63—63. The handle 64 includes a front portion 68 and a rear portion 66.

The rear portion 66 of the welding gun handle 64 is curved downward at an angle of approximately 10° off the centerline 63—63. This gentle curve in the rear portion 66 of the handle 64 is designed to make it more comfortable to hold.

At the front portion 68 of the welding gun handle 64 is a flexible boot 70. The boot, which is typically formed from an elastomeric material, is flexible and allows the conductor tube 72 to be readily adjusted into the various positions which will be discussed more thoroughly hereinafter by the welder. Adjustment of the conductor tube assembly 71 does not require any tools or disassembly of the welding gun 1. The rear portion 74 of the conductor tube 72 connects with the welding gun 1. The front portion 76 of the conductor tube 72 receives the nozzle 78. The term "conductor tube assembly" 71, as used herein, includes the conductor tube 72, the nozzle 78, the ball shaped protrusion 100, the gas diffuser 492, the contact tip 506 and the flexible boot 70.

The welding wire 24 sticks out in front of the nozzle 78 after passing through the conductor tube 72, the interior of the welding gun 1 and the coaxial welding cable 42.

The welding gun handle 64 has an upper surface 80 and a lower surface 82. Pivotally mounted in the lower surface of the handle 64 is an elongate trigger 84. A first screw 136 and a second screw 140 hold the welding gun handle 64 together.

FIG. 3 is a plan view of the lower surface 82 of the handle 64 along the line 3—3 of FIG. 2. The trigger 84 is an elongate structure which is pivotally mounted near the front portion 68 of the handle 64. The trigger guard 86 protrudes from the lower surface 82 on both sides of the trigger 84 and is designed to reduce the risk of unintentional actuation of the trigger. In practice, welders may hold the handle 64 by the rear portion 66 or in the alternative they may grip the handle 64 near the front portion 68. The elongate trigger 84 is strategically positioned so that it may be easily actuated regardless of where the welder is holding the handle 64.

Figure 4:
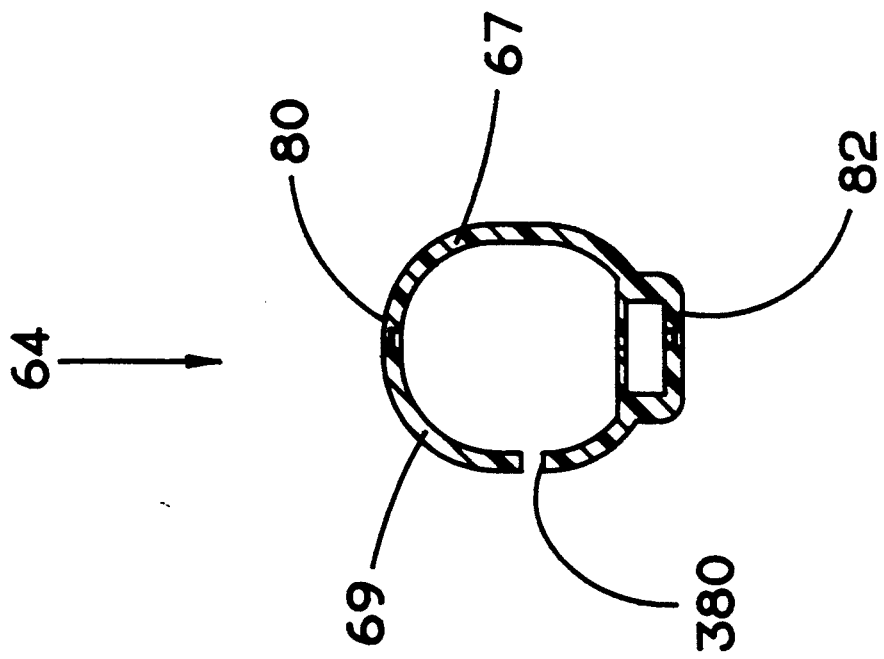
FIG. 4 is a section view of the handle assembly along the line 4—4 of FIG. 2.

FIG. 4 is a section view of the handle 64 along the line 4—4 of FIG. 2. The handle 64 can be compression molded into two halves. The right half 67 and the left half 69 fit together as shown in the drawing and are held together by screws 136 and 140 or other suitable fastening means. The upper surface 80 of the handle 64 is generally oval shaped. The lower surface 82 protrudes from the handle and is generally rectangular shaped to provide a gripping surface for the operator's fingers. A hole 380 is formed in the left half 69 of the handle 64. The hole 380 allows an allen wrench to pass through the handle 64 to tighten or untighten an allen head screw 276 in the first cable connector, discussed more completely hereinafter. The hole 380 in the handle 64 is a necessary feature which allows the welding cable 42 to be removed from the welding gun, without complete disassembly of the unified handle assembly 190.

Figure 5:
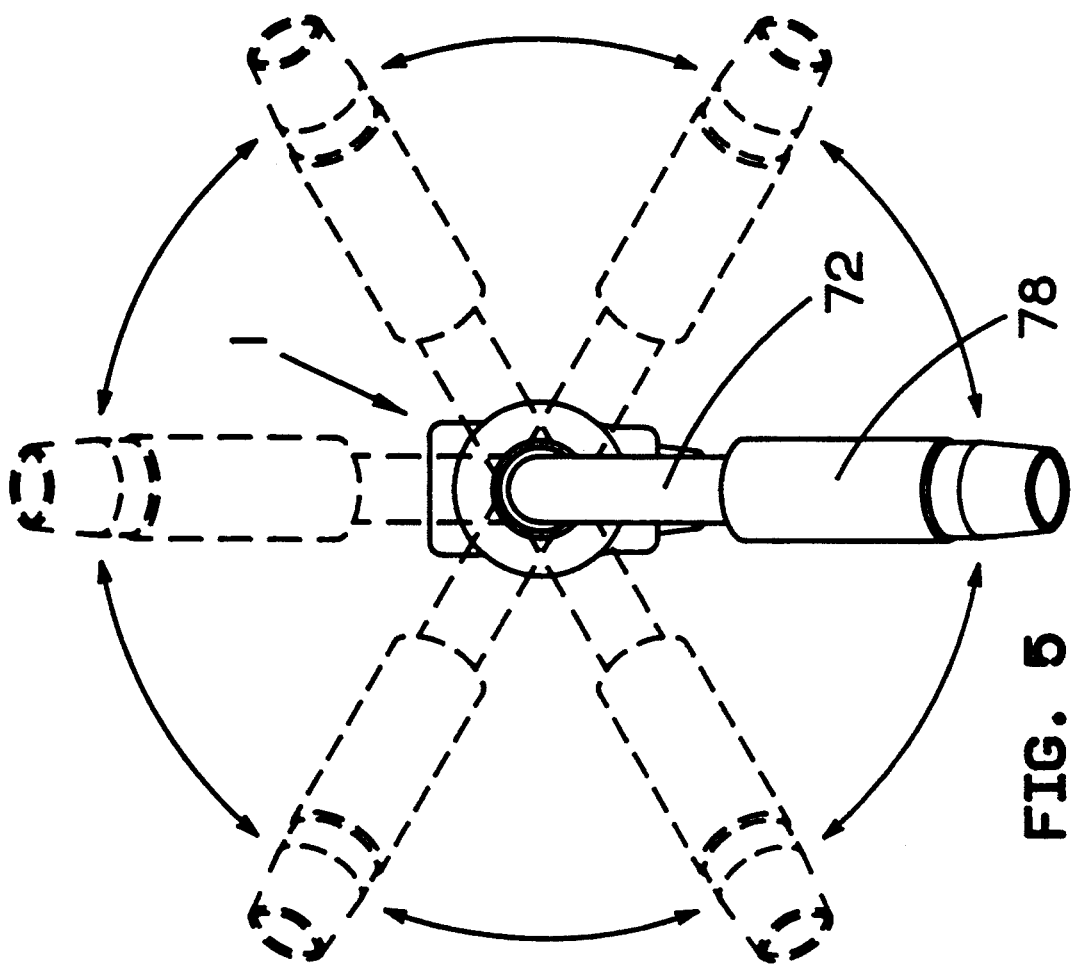
FIG. 5 is a schematic view of the front end of the welding gun along the line 5—5 of FIG. 2.

FIG. 5 is a front view of the welding gun 1 showing the conductor tube 72 and the nozzle 78. The conductor tube 72 can be rotated 360° about the front of the welding gun as shown by the phantom drawings in this figure. Rotation of the conductor tube can be manually accomplished by the welder without resort to tools or other special apparatus. If a production line welder is experiencing fatigue from having to repeatedly weld a product in a certain angular position, he can easily and quickly rotate the conductor tube assembly 71 in one direction or the other.

FIG. 6 is a side elevation view of the welding gun 1. The conductor tube 72 and the nozzle 78 can be articulated up and down as shown by the phantom drawings approximately 15° from the centerline 63—63 of the handle 64. Again, if the production line welder is experiencing fatigue from repetitive welding operations, he can easily and quickly without the need of tools, articulate the conductor tube assembly 71 up or down or side to side, as shown in the following figures.

FIG. 7 is a top plan view of the welding gun 1. The right half 67 and the left half 69 of the handle 64 are more clearly seen in this view. The conductor tube 72 and the nozzle 78 can be articulated approximately 15° to the left or to the right of the centerline 63—63 of the welding gun handle 64.

FIG. 8 is a front view of the welding gun 1 which shows that the conductor tube 72 and the nozzle 78 can be articulated approximately 15° to the left or to the right of the centerline 63—63 of the handle 64 as shown by the phantom drawings. The conductor tube assembly 71 can be articulated to any desired position in a conical area radiating from the front of the welding gun 1. This conical area is approximately 15° wide as measured from the centerline 63—63 of the handle 64.

Figures 9, 10:
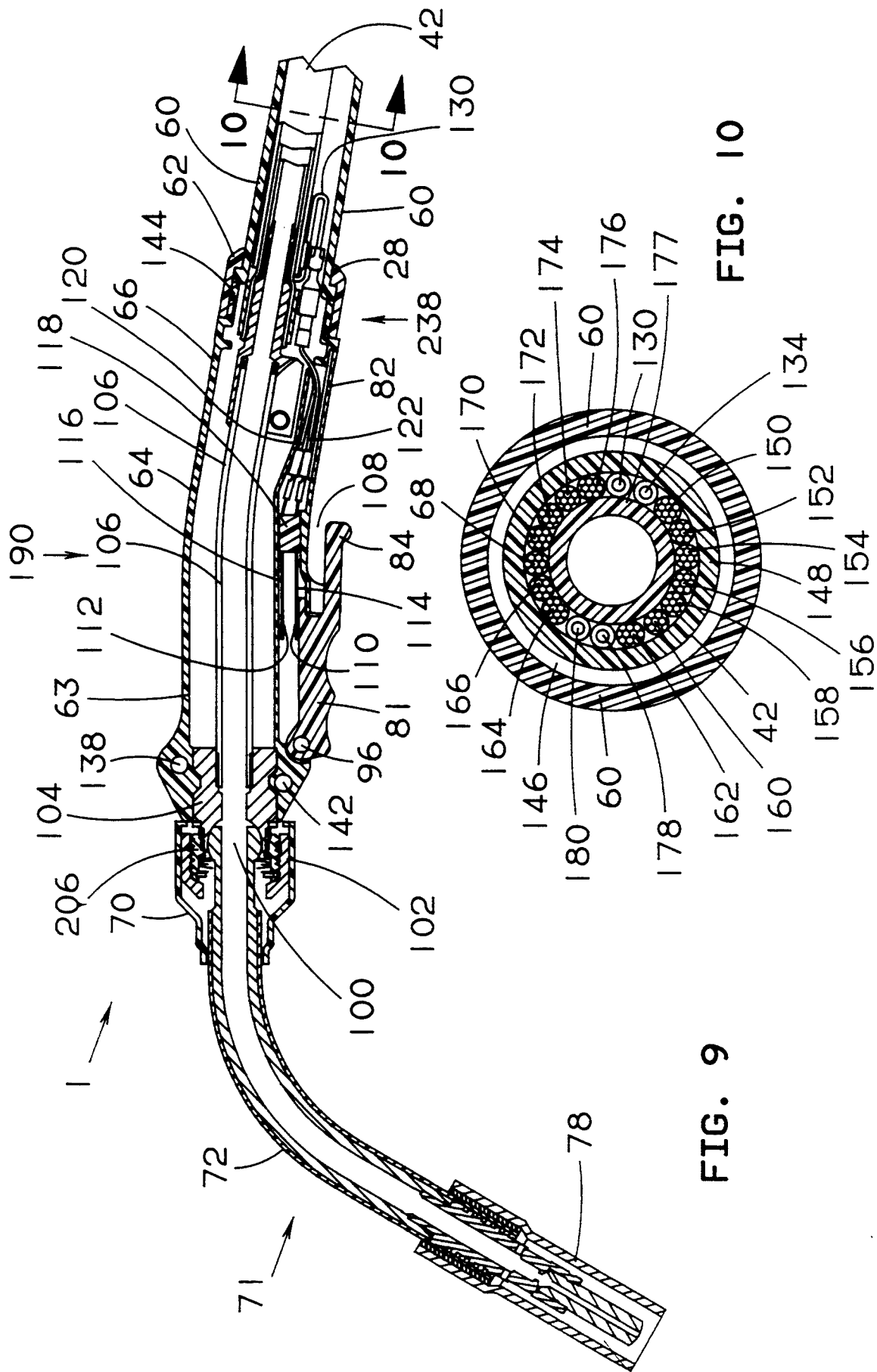
FIG. 9 is a section view of the welding gun and conductor tube assembly.
FIG. 10 is a section view of the coaxial welding cable and strain relief along the line 10—10 of FIG. 9.

FIG. 9 is a section view of the MIG welding gun 1. The unitary handle assembly is generally identified by the numeral 190. The term "unitary handle assembly" 190, as used herein, includes the left half 69 and the right half 67 of the handle 64, the screws 136 and 140, or other suitable fastening means, the wave washer assembly 102, nut 207, the connector block 104, the connector tube 106, the trigger 84, the trigger switch 108 and associated wiring and connectors.

The coaxial cable 42 is supported by the strain relief 60 which is connected by the sleeve 62 to the welding gun handle 64. The flexible boot 70 engages the front portion 68 of the handle 64. The conductor tube assembly 71 can be adjustably positioned by the operator to reduce fatigue and to weld hard to reach locations. Angular adjustment of the conductor tube assembly 71 is quickly accomplished by the welder without the need of tools. The elongate trigger 84 is pivotally mounted by a pin to the welding gun handle 64. A bore 96 is formed in the end of the trigger 84 to receive the aforementioned pin, which is not shown in the drawings.

Figure 15:
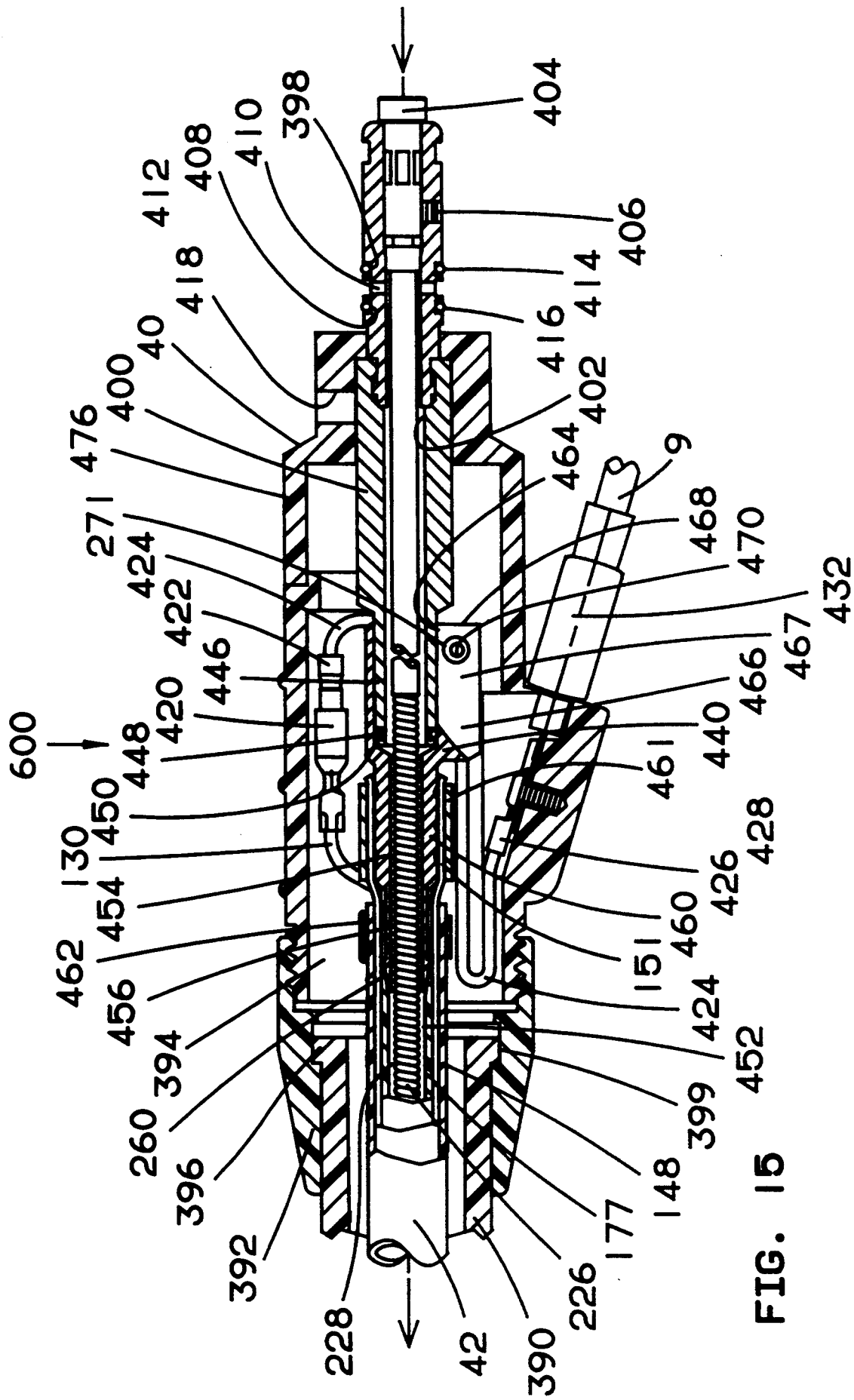
FIG. 15 is a section view of the rear connector and the second cable connector assembly.

A first cable connector assembly, generally identified by the numeral 238, connects one end of the coaxial cable 42 to the welding gun 1. A second cable connector assembly generally identified by the numeral 600 connects the other end of the coaxial cable 42 to the rear connector 40, as shown in FIG. 15. The first cable connector assembly 238 and the second cable connector assembly 600 are substantially the same and therefore can be interchangeably connected to either the welding gun 1 or the rear connector 40. The term "quick disconnect cable assembly," as used herein, includes the first cable connector assembly 238, the second cable connector assembly 600 and the coaxial cable 42.

The conductor tube 72 is adjustably attached by a ball and socket joint generally identified by the numeral 100 to the welding gun 1. A wave washer assembly, generally identified by the numeral 102, applies pressure to the ball and socket joint 100, thus holding the conductor tube in a fixed but readily adjustable position. A connector block 104 is positioned in the front portion 68 of the handle 64. A connector tube 106 runs from the connector block 104 to the rear portion 66 of the handle 64. The first cable connector assembly 238 is releasibly connected to one end of the connector tube 106.

The trigger switch, generally identified by the numeral 108 is actuated by depressing the elongate trigger 84 towards the lower surface 82 of the handle 64 of the welding gun 1. The trigger switch 108 is shown in the off position in this figure. (The circuit is open.) When the elongate trigger 84 is depressed a first electrical contact 110 is forced into electrical contact with a second electrical contact 112, thus closing the control circuit. When the control circuit is closed, the welding power supply 10 provides electricity, welding gas and welding wire to the welding gun 1. The contacts 110 and 112 are mounted on flexible fingers, respectively 114 and 116, which are secured to a base 118. Control wire 120 is connected to the flexible finger 116. A second control wire 122 is connected to the flexible finger 114. The control wire 122 connects to a male terminal 124. The control wire 120 connects to a male terminal 126, shown in FIG. 14. The male terminal 124 is releasibly connected to a female terminal 128 which connects to a control wire 130 which runs the length of the coaxial welding cable 42. The male terminal 126 releasibly connects to a female terminal 132 which connects to a control wire 134 which also runs the length of the coaxial welding cable 42.

The handle 64 is compression molded into two pieces, a left half 69 and a right half 67. These two pieces are held together by two screws 136 and 140 or other suitable fastening means. The first screw 136 passes through a bore 135, not shown, in the left half 69 of the handle 64. The bore 135 has a shoulder 133 formed therein to engage the head 131 of the screw 136. In the right half 67 of the handle 64 is a binder post 139 which threadably engages the screw 136. The second screw 140 passes through a bore 129, not shown, in the left half 69 of the handle 64. The bore 129 has a shoulder 127 formed therein to engage the head 125 of the second screw 140. In the right half 67 of the handle 64 is a binder post 143 which threadably engages the second screw 140. Together the screw 136 and the binder post 130, and the screw 140 and the binder post 139 hold the left half 69 and the right half 67 of the handle 64 together.

FIG. 10 is a section view along the line 10—10 of FIG. 9 of the coaxial cable 42 and the strain relief 60. The strain relief 60 is formed from a thick elastomeric material, which is also an electrical insulator, to provide support to the coaxial welding cable 42. There is an annular gap 146 between the inside diameter of the strain relief 60 and the outside diameter of the coaxial welding cable 42.

The design of the coaxial welding cable 42 as shown in this figure is generally accepted by the industry and is used on most MIG welding systems. The exterior insulating sheath 148 is formed from a flexible insulating material such as neoprene. Underneath the outer insulating sheath 148 is copper stranding 151 which is composed of a plurality of copper strands 150, 152, 154, 156, 158, 160, 162, 164, 166, 168, 170, 172, 174, and 176. The number and size of the copper strands is dictated by the amperage rating of the coaxial welding cable 42. Interwoven with the copper stranding 151 is a first control wire 130 and a second control wire 134. These control wires connect to the trigger switch 108 which is actuated by the trigger 84 to energize the welding gun 1.

The coaxial welding cable 42 may also have additional control wires 178 and 180 which also run the length of the coaxial cable 42. The function of these auxiliary control wires will be discussed in greater depth hereinafter. Underneath the copper stranding 151 is a gas feed tube 177, which is also typically formed from neoprene. Inside the gas feed tube 177 is the welding wire feed tube 226, not shown in this view. Shielding gas passes through the annular area between the inside diameter of the gas feed tube 177 and the outside diameter of the welding wire feed tube 226.

Figure 11:
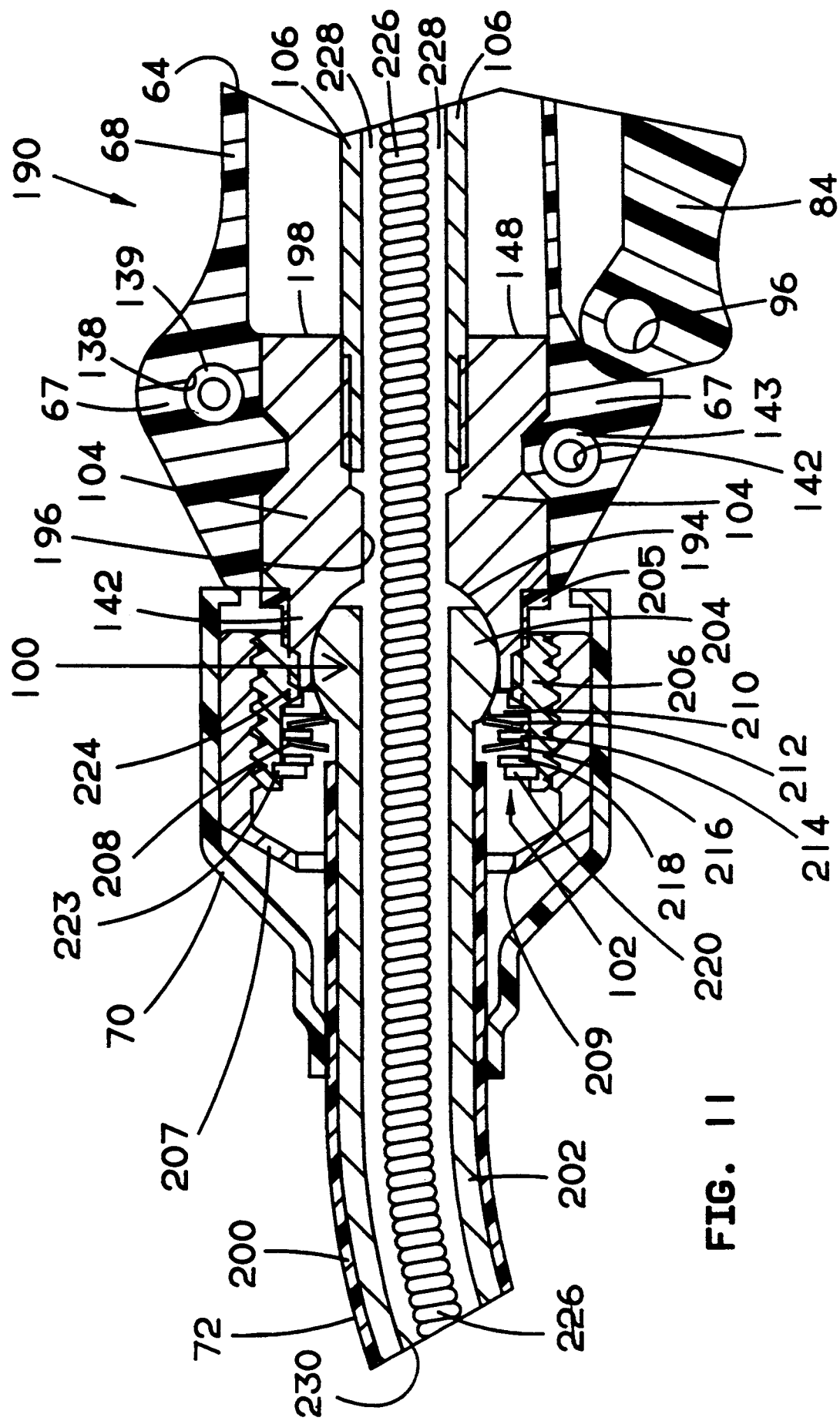
FIG. 11 is an enlarged section view of the front end of the welding gun and the ball and socket joint shown in FIG. 9.

FIG. 11 is an enlarged section view of the ball and socket joint 100 which connects the conductor tube 72 to the handle assembly, generally identified by the numeral 190. The forward portion of the handle 64 is molded to receive and lock the connector block 104 in a rigid position. The front end 192 of the connector block 104 forms a spherical socket 194. A central longitudinal bore 196 runs the length of the connector block 104. The connector tube 106 threadably engages the bore 196 on the rear end 198 of the connector block 104.

The conductor tube 72 includes an outer insulating surface 200 and a rigid interior tube 202 which is electrically conductive on one end of the rigid interior tube 202 is a ball shaped protrusion 204 which is sized and arranged to engage and rotate in the spherical socket 194 of the connector block 104. The wave washer assembly 102 is a means for applying pressure to the ball shaped protrusion 204 and the connector block 104 to allow the conductor tube 72 to rotate 360° about the centerline of the handle 64 and to articulate approximately 15° or more in a conical area extending from the front end 192 of the connector block 104.

The wave washer assembly 102 includes a threaded collet 206 which threadably engages the front end 192 of the connector block 104. A lock ring 205, which is typically nylon, encircles the front end 192 of the connector block 104 and prevents the collet 206 from working loose. The exterior of the collet 206 is threaded to receive a rigid spacer 207. Inside of the threaded collet 206 is a recess 208 which receives a follower 210, a first wave washer 212, a flat washer 214, a second wave washer 216, and a second flat washer 218. A channel 223 receives a split retaining ring 220. The wave washers are captured between the split retaining ring 220 and a shoulder 224 on the interior of the threaded collet 206. The wave washers 212 and 216 exert spring pressure on the follower 210 which exerts force against the ball shaped protrusion 204 allowing the conductor tube 72 to be rotated 360° about the centerline of the handle and to be articulated approximately 15° or more up and down and side to side in a generally conical area extending from the front end of the connector block 104.

A welding wire feed tube 226 is formed from helically wound metal wire and serves as the conduit for the welding wire 24. Those skilled in the art will recognize that teflon tubes are sometimes substituted for the helically wound metal tube 226. The welding wire feed tube 226 runs from the rear connector through the coaxial welding cable 42 and through the welding gun 1. The welding wire feed tube 226 can be removed and replaced, if it wears out or becomes jammed with welding wire 24. There is an annular space 228 between the welding wire feed tube 226 and the connector tube 106. The inert shielding gas flows through the annular space 228 inside the connector tube 106 and then passes through the annular area 230 in the conductor tube 72.

To remove the conductor tube 72 from the unitary handle assembly 190, the operator first slips the flexible boot 70 over the rigid spacer 207 and then slides the flexible boot 70 partially down the conductor tube 72. The rigid spacer 207 is then exposed and can be unthreaded from the collet 206 with a wrench or pliers and slipped over the connector tube 72. The collet 206 is exposed and can be unthreaded from the front end 192 of the connector block 104 by a wrench or pliers. The conductor tube 72 can then be removed from the connector block 104. Before reassembly, it may be necessary to replace the nylon lock ring 205 which may be deformed due to contact with the threads on the collet 206. To reassemble the conductor tube 72 and the unitary handle assembly 190, one repeats the above steps in reverse order.

A first elongate binder post 139 is pressed into the bore 138 of the right half 67 of the handle 64. On the exterior diameter of the binder post 139 are ridges, not shown in the drawing, which engage the bore 138 and lock the binder post 139 in place to prevent it from rotation. On the interior diameter of the binder post 139 are threads which receive the screw 136. A second elongate binder post 143 is pressed into the bore 142 of the right half 67 of the handle 64. On the exterior diameter of the binder post 143 are ridges, not shown in the drawing, which engage the bore 142 and lock the binder post 143 in place to prevent it from rotation. On the interior diameter of the binder post 143 are threads, not shown in the drawing, which receive the screw 140. Acting together the screw 136 and the binder post 139 and the screw 140 and the binder post 143 hold the right half 67 and the left half 69 of the handle 64 together.

Figure 12:
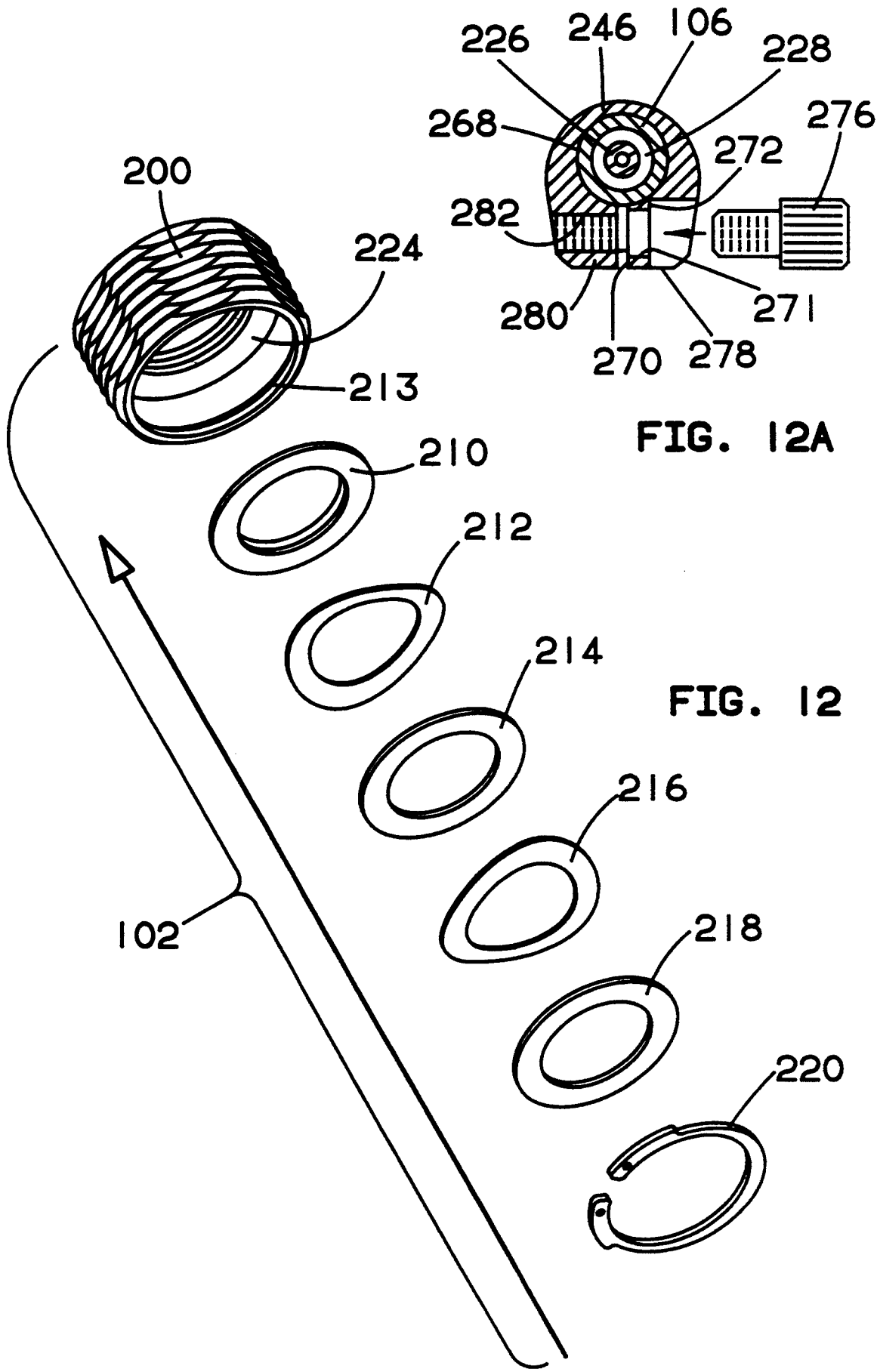
FIG. 12 is an enlarged exploded perspective view of the wave washer assembly shown in section view in FIG. 11.

FIG. 12 is an exploded perspective view of the wave washer assembly 102. A recess 208 is cut on the interior of the threaded collet 206 to receive and hold the wave washers. A channel 223 receives the split retaining ring 220. A shoulder 224 is formed inside the threaded collet 206. The wave washers are held in place between the split retaining ring 220 and the shoulder 224. The term "wave washer assembly" 102, as used herein, includes the collet 206, a follower 210, a first wave washer 212, a flat washer 214, a second wave washer 216, a second flat washer 218 and a split retaining ring 220. Those skilled in the art will recognize that there are other equivalent components which would be a suitable means for applying pressure to the ball shaped protrusion 204 and the connector block 104 to allow the conductor tube 72 to rotate and to articulate as described hereinabove.

Figure 13:
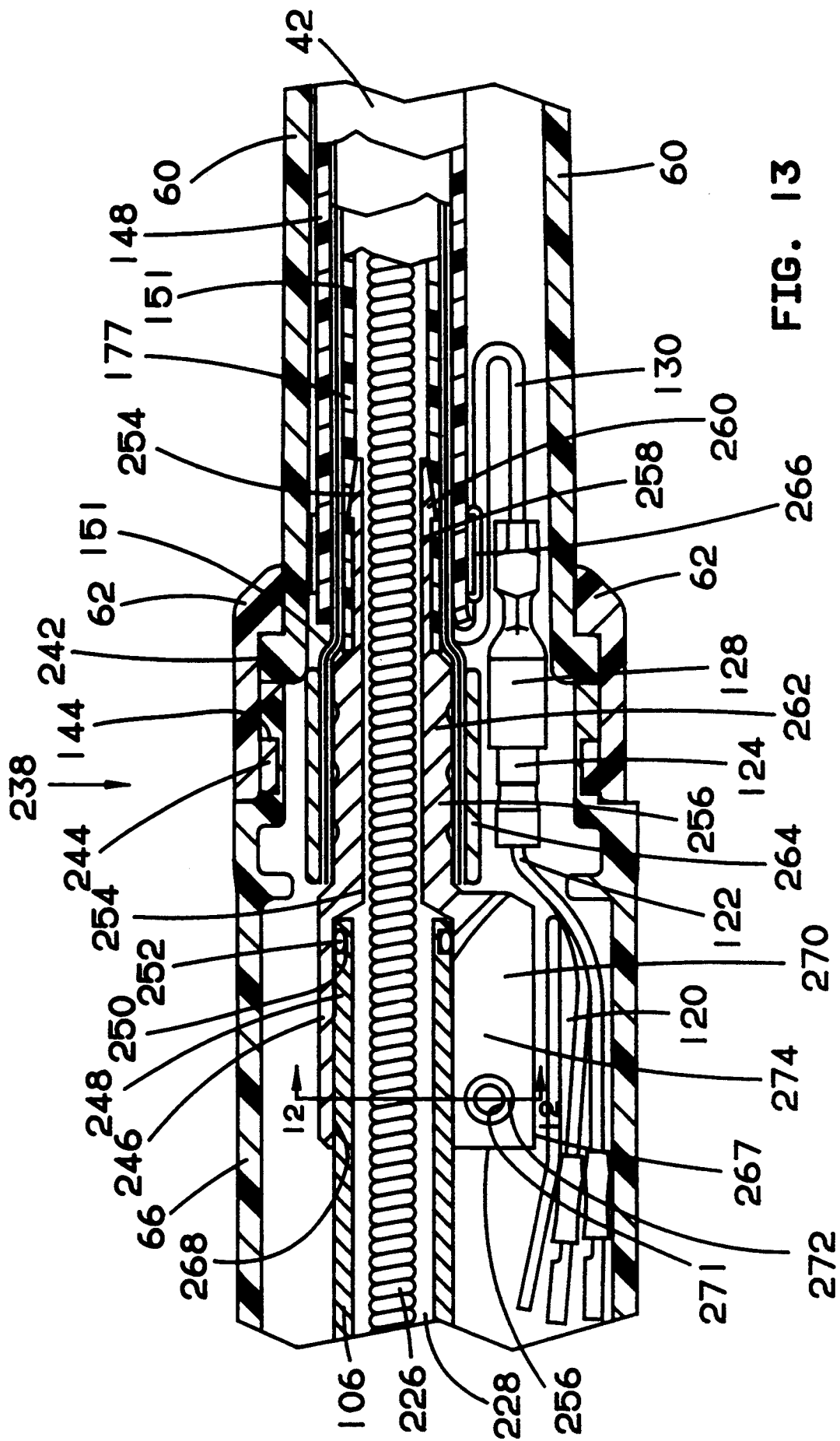
FIG. 13 is an enlarged section view of the rear end of the welding gun handle and the first cable connector assembly shown in FIG. 9.

FIG. 13 is a section view of the first cable connector assembly 238 attached to the welding gun 1. The first cable connector assembly 238 is located on one end of the coaxial cable 42 and a second cable connector assembly 600 is located on the opposite end of the coaxial cable 42. The first cable connector assembly 238 and the second cable connector assembly 600 are substantially the same so that either end of the coaxial cable 42 can be connected to either the welding gun 1 or the rear connector 40. This is a particularly useful feature because the welding gun 1 utilizes a unitary handle design which can be used with the 250 amp., the 450 amp. and the 600 amp. version of the apparatus. As the amperage increases it is necessary to increase the size of the coaxial cable 42 and the size of the conductor tube assembly 71; however, the same unitary handle assembly 190 can be used with all three different versions.

FIG. 13 is a section view of the first cable connector assembly 238 attached to the rear portion 66 of the handle 64. The term "first cable connector assembly" 238, as used herein, includes the first cable connector 246, the allen head screw 276, the first circular compressive clamp 264, and the second circular compressive clamp 266. The coaxial cable 42 is supported by the strain relief 60. A sleeve 62 engages a circumferential flange 242 on the end of the strain relief 60. The sleeve 62 is removably connected to the rear portion 66 of the handle 64. A protrusion 244 extends from the inside diameter of the sleeve 62 and threadably engages a grove 144 in the rear portion 66 of the handle 64. To remove the sleeve 62 from the handle 64, it is twisted counterclockwise which disengages the protrusion 244 from the grove 144 allowing the sleeve 62 to be disconnected from the handle 64. The sleeve 62 can be manually detached from the handle 1—no tools are required.

The coaxial cable 42 includes an exterior insulating sheath 148 which is typically manufactured from neoprene. Underneath the sheath 148 is a layer of copper stranding 151. A gas feed tube 177 is positioned underneath the copper stranding 151. The gas feed tube 177 is air tight and is typically manufactured from neoprene. Inside the gas feed tube 177 is the welding wire feed tube 226. An annular space 228 exists between the inside diameter of the gas feed tube 177 and the outside diameter of the wire feed tube 226. The shielding gas flows through the annular space 228. Continuous welding wire passes through the inside of the hollow wire feed tube 226. Electricity is transmitted along the coaxial cable 42 through the copper stranding 151. Two control wires 130 and 134 also run the length of the coaxial cable 42. A female terminal 128 is connected to the end of the control wire 130. A male terminal 124 removably engages the female terminal 128 providing a connection for the control wire 130 in the coaxial cable 42 with the control wire 122 in the handle assembly 190. The control wire 122 connects to the trigger switch 108. Another control wire 134 also runs the length of the coaxial cable 42. The control wire 134 in the coaxial cable 42 removably connects to the control wire 120 in the handle assembly 190 as better seen in the next figure. When the operator depresses the trigger, the control circuit is closed which causes the welding power source to provide electricity, continuous welding wire and shielding gas to the welding gun 1.

The coaxial cable 42 connects to a first cable connector 246 which removably attaches to the connector tube 106. At the rear end 248 of the connector tube 106 is a channel 250 which receives an O-ring 252. The purpose of the O-ring 252 is to provide a gas seal between the first cable connector 246 and the connector tube 106 to prevent shielding gas from leaking from the annular opening 228 to atmosphere.

The first cable connector 246 has an elongate central bore 254 which allows the welding wire feed tube 226 to run through the cable connector 246. The first cable connector 246 includes an elongate extension 256 which has a first tubular segment 258 sized and arranged to engage the interior diameter of the gas feed tube 177. There is a radial prong 260 formed on the end of the first tubular segment 258 which grips the gas feed tube 177 and prevents it from sliding off the first segment 258. The elongate extension 256 includes a second tubular segment 262 which has a larger diameter than the first segment 258. The second tubular segment 262 is sized and arranged to engage the interior of the tubular layer of copper stranding 151. A circular compressive clamp 264 connects the copper stranding 151 with the second tubular segment 262 of the cable connector 246. A second circular compressive clamp 266 compresses the exterior insulating sheath 148 and generally attaches it and the gas feed tube 177 to the first tubular segment 258.

On the front end 265 of the cable connector 246 there is an enlarged bore 268 which is sized and arranged to receive the connector tube 106. When the cable connector 246 is viewed from the front end 265, the cable connector 246 has an inverted U-shape. At the bottom of the first cable connector 246, a slot 270 is cut through to the bore 268 which creates the inverted U-shape as better seen in FIG. 12A. The slot 270 gives the front end 165 of the cable connector 246 some flexibility. An allen screw 276 is used to tighten the cable connector 246 about the connector tube 106. The right leg 278 of the first cable connector has a smooth bore 271 cut therein. A shoulder 272 is formed in the bore 271. The allen screw 276 passes through the smooth bore 271 and the head of the allen screw bottoms against the shoulder 272. The left leg 280 of the cable connector 246 has a threaded bore 282 cut therein which receives the threads on the allen screw 276. When the allen screw 276 is tightened the left leg 280 and the right leg 278 of the inverted U-shaped first cable connector 246 are drawn towards each other which reduces the interior diameter of the bore 268 thus creating compressive forces on the outside diameter of the connector tube 106 to attach the first cable connector 246 to the connector tube 106.

Figure 14:
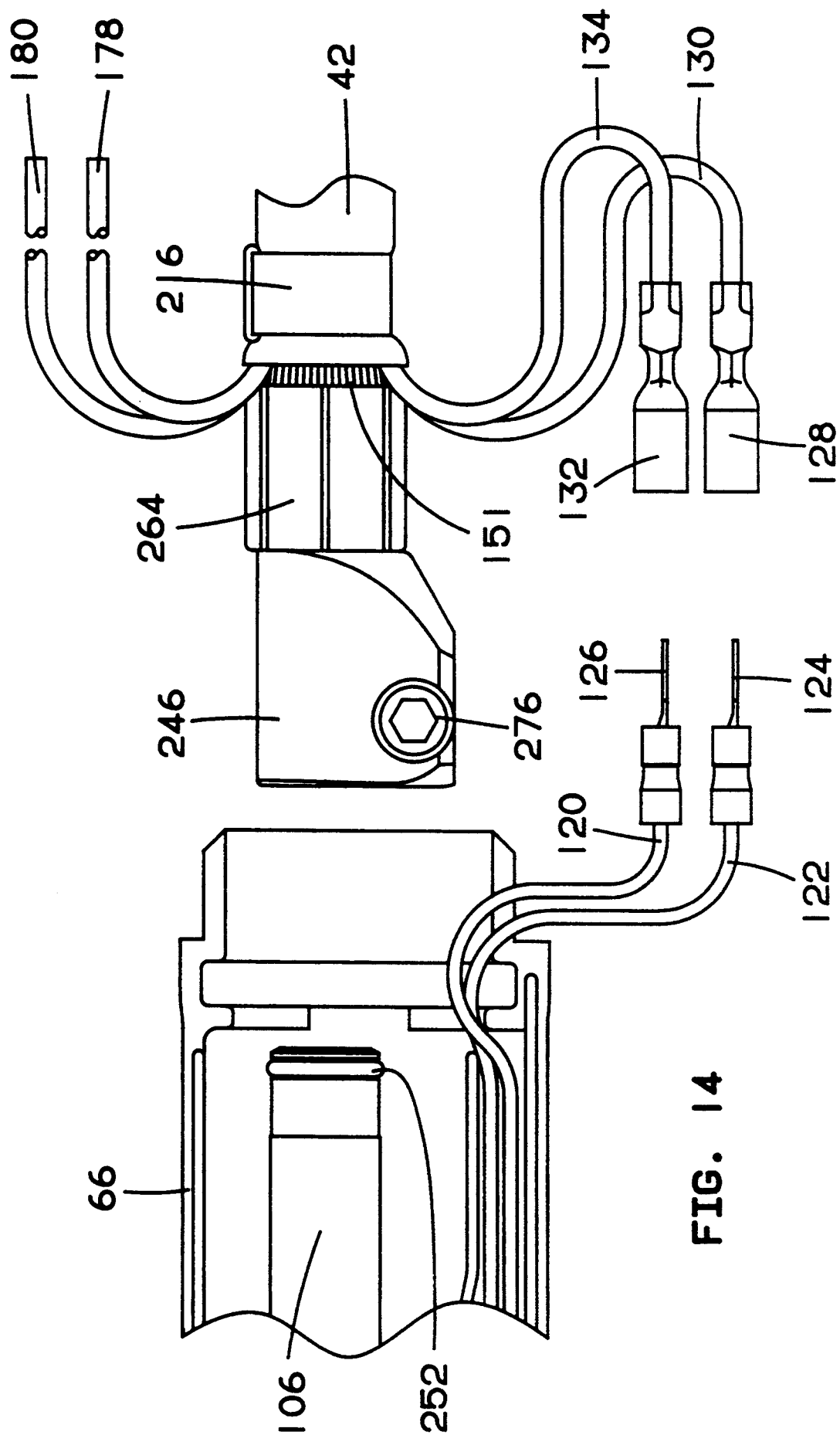
FIG. 14 shows a partial section view of the rear end of the welding gun handle disconnected from the first cable connector assembly.

FIG. 14 shows the first cable connector assembly 238 detached from the welding gun 1. Detachment of the first cable connector assembly 238 does not require complete disassembly of the welding gun 1 like prior art devices. This makes it more convenient for the welder to make repairs and reduces down time. It also reduces inventory costs for welding supply distributors.

The only tool that is needed to disconnect the first cable connector assembly 238 from the welding gun 1 is an allen wrench. The operator places the allen wrench through the hole 380 in the left half 69 of the handle 64. This allows the allen wrench to engage the allen screw 276. When the allen screw is rotated counterclockwise the compressive forces being exerted on this connector tube 106 by the left leg 280 and the right leg 278 of the first cable connector 246 are relaxed. The operator then twists the sleeve 62, shown in previous drawings, counterclockwise to disengage the protrusion 244 from the grove 144 in the rear 66 of the handle 64. The sleeve is then slipped away from the rear portion 66 of the handle 64 and back over the strain relief 60. The strain relief is then slipped back over the coaxial cable 42. The operator can then gently pull the first cable connector assembly 238 away from the welding gun 1.

The control wires are then exposed and can be disconnected. The operator simply pulls the female terminal 128 away from the male terminal 124 which disconnects the control wire 130 in the coaxial cable 42 from the control wire 122 in the welding gun 1. Likewise, the operator gently pulls the female connector 132 away from the male connector 126 thus disconnecting the control wire 134 in the coaxial cable 42 from the control wire 120 in the welding gun 1. This completes the disconnection of the first cable connector assembly 238 from the welding gun 1 as shown in FIG. 14. The only tool needed is an allen wrench. It is not necessary to disassemble the unitary handle assembly 190. To reconnect the welding gun 1 with the first cable connector assembly 238, one repeats the above steps in reverse order.

To disassemble the unitary handle assembly 190, the operator first detaches the first cable connector assembly 238 from the rear portion 66 of the handle 64, as described above. The operator then removes the screws 136 and 140 from the binder post 139 and 143 which allows the left half 69 to be separated from the right half 67 of the handle 64. To reassemble, the operator repeats the aforementioned steps in reverse order.

Figure 15A:
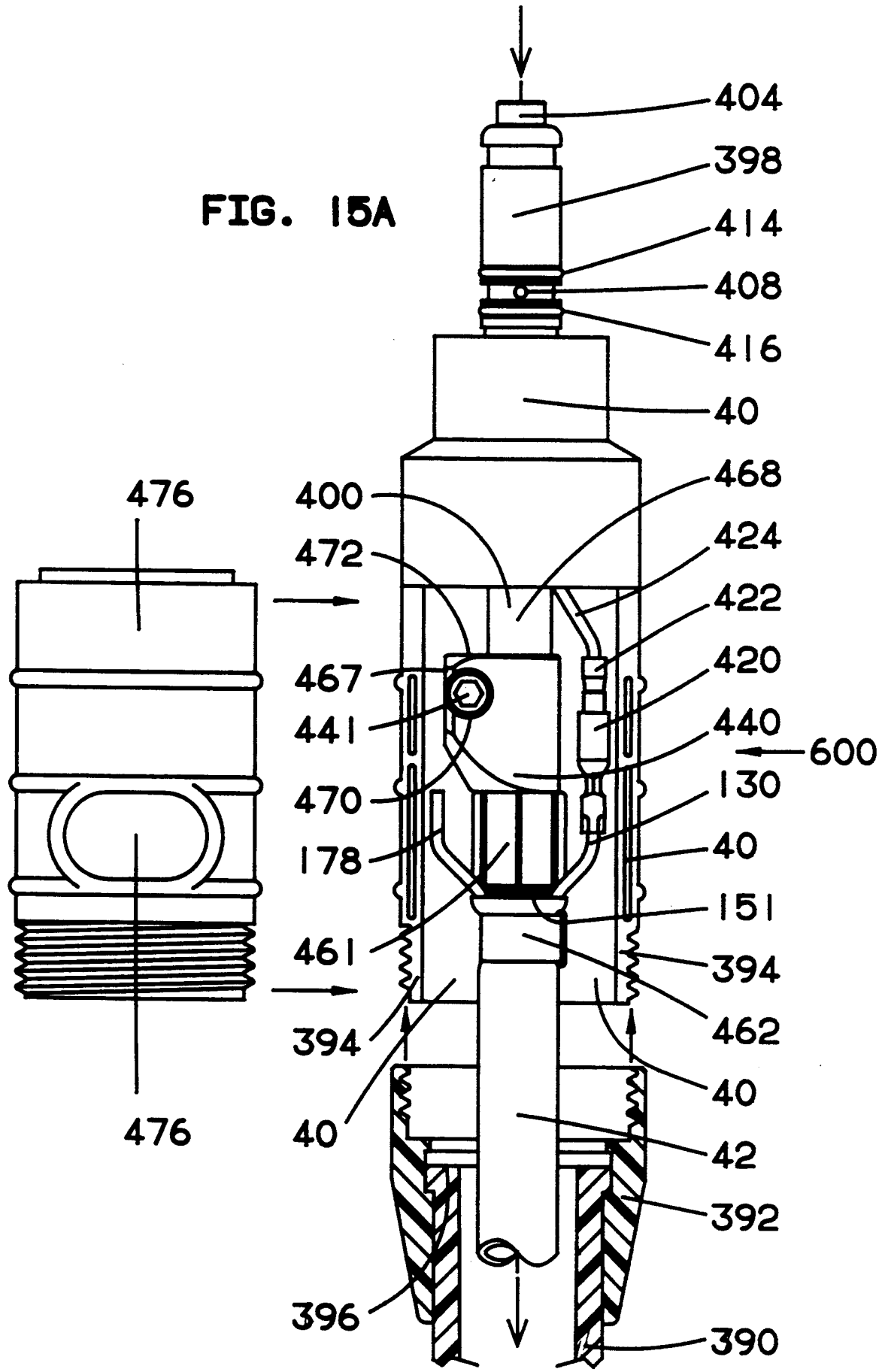
FIG. 15A is a top plan view of the rear connector with the cover removed exposing the second cable connector assembly and allen head screw.

FIG. 15 is a section view of the second cable connector assembly 600 attached to the rear connector 40. In this view, the second cable connector assembly 600 has been rotated 90° from the normal manufacturing position to facilitate disclosure herein. For manufacturing purposes, Applicants recommend that the second cable connector assembly 600 be positioned relative to the rear connector 40 as shown in FIG. 15A. The purpose of the rear connector 40 is for attaching the welding gun 1 and the coaxial cable 42 to the welding power supply 10. The coaxial cable 42 is supported in the rear connector 40 by a strain relief 390. A sleeve 392 threadably engages the rear portion 394 of the rear connector 40. The strain relief 390 has an outward circumferential flange 396 which engages a channel 399 in the sleeve 392 thus preventing the strain relief 390 from slipping out of contact with the sleeve 392 and the rear connector 40. A cover 476 fits on the top of the rear connector 40. When removed, the cover 476 allows access to the hollow interior of the rear connector 40 so that the operator can gain access to the rear connector assembly 240. With the cover 476 removed, the operator has access to the allen head screw 441 which can be tightened or untightened by an allen wrench.

A rear plug 398 extends from the rear connector 40 for connection to the adapter 36 or directly to the welding power source 10. The rear plug 398 is conductive and transfers electricity from the welding power source 10 to the copper stranding 151 in the coaxial cable 42. The rear plug 398 threadably engages a rear connector tube 400 which is likewise conductive and transfers electricity from the welding power source 10 to the copper stranding 151. A central longitudinal bore 402 passes through the center of the rear plug 398 and the rear connector tube 400 and receives the conduit stop 404 of the welding wire feed tube 226. Those skilled in the art will recognize that the conduit stop 404 is crimped or otherwise connected to the welding wire feed tube 226. The conduit stop 404 and the welding wire feed tube 226 can be removed and replaced if it wears out or if a jam occurs. A set screw 406 is perpendicularly aligned in the rear plug 398 to hold the conduit stop 404 in place. To replace the welding wire feed tube 226 and the conduit stop 404, the set screw 406 must be untightened. One or more gas passageways 408 are formed in the rear plug 398 to allow the shielding gas to pass into the annular space 228 in the coaxial welding cable 42. A first channel 410 is formed on one side of the gas passageway 408 and a second channel 412 is formed on the opposite side of the gas passageway 408. A first O-ring 414 fits in the first channel 410 and a second O-ring 416 fits in the second channel 412 thus providing a gas tight seal about the gas passageway 408.

The control wires 130 and 134 run the length of the coaxial cable 42. On the end of the control wire 130 is a female terminal 420 which is sized and arranged to receive a male terminal 422 which connects to the control wire 424 in the rear connector 40. The other end of the control wire 424 connects to another terminal 426 which is attached by a screw 428 to the interior of the rear connector 40. A male terminal 430 connects with the other terminal 426 and is likewise held in place by the screw 428. A female connector 432 is positioned on one end of the control wire 9 which extends from the welding power source 10.

Although not shown in this figure, the other control wire 134 runs the length of the coaxial welding cable 42 and terminates with a female terminal 434. A male terminal 436 is sized and arranged to releasibly engage the female terminal 434. The male terminal 436 is connected to a control wire 438 in the rear connector 40. The second control wire 438 in the rear connector 40 likewise connects to a male terminal, not shown in the drawings, which is identical to the other male terminal 430. Likewise, another control wire engages the terminal not shown, for connection to the welding power source 10. In conclusion, two control wires emanate from the welding power source 10 and are releasibly connected to the rear connector 40. Two control wires 424 and 438 are located in rear connector 40 and are releasibly connected to the second cable connector assembly 600. The two control wires 130 and 134 run the length of the coaxial cable 42 and are releasibly connected at the first cable connector assembly 238 to two control wires 120 and 122 in the welding gun 1. The control wires 120 and 122 in the welding gun 1 connect to the trigger switch 108 which is controlled by the trigger 84. When the trigger 84 is depressed the circuit is closed and the welding power source 10 is actuated providing electricity, continuous welding wire and shielding gas through the rear connector 40, the coaxial cable 42, to the welding gun 1.

On one end 446 of the rear connector tube 400 is a channel 448 which is sized to receive an O-ring 450 to form a gas tight seal between the rear connector tube 400 and the second cable connector 440 to prevent leaks of the shielding gas to atmosphere.

The second cable connector 440 is substantially identical to the first cable connector 246. This allows the first cable connector assembly 238 and the second cable connector assembly 600 to engage either the welding gun 1 or the rear connector 40. This interchangeable feature allows the operator to easily and quickly switch the ends of the coaxial cable 42 for maintenance purposes. The term "second cable connector assembly" 600, as used herein, includes the second cable connector 440, the allen head screw 441, the circular compressive clamp 461, and the second circular compressive clamp 462.

The second cable connector 440 includes a central bore 452 through which the welding wire feed tube 226 passes. The second cable connector 440 includes an elongate extension 454 which has two tubular segments. The first tubular segment 456 is sized and arranged to engage the interior of the gas hose 177. A prong 260 extends radially from the first tubular segment 456 and grips the interior diameter of the gas hose 177 and prevents it from slipping off of the first tubular segment 456. The second tubular segment 460 is larger in diameter than the first segment 456 and is sized and arranged to engage the interior of the copper stranding 151. A circular clamp 461 attaches the copper stranding to the second segment 460. Another circular clamp 462 connects the exterior sheath 148 and the other internals of the coaxial cable 42 to the first segment 456 of the second cable connector 440.

On the front end 468 of the second cable connector 440 a bore 464 is formed which is in communication with the other bore 452. The interior of the bore 464 is sized and arranged to receive the rear connector tube 400. A slot 466 is cut in the bottom 467 of the second cable connector 440.

When viewed from the front end 468, the second cable connector 440 appears as an inverted U-shaped structure with a central bore 464, a left leg 472 and a right leg 474. The slot 466 creates the inverted U-shape effect on the front 468 end of the second cable connector 440. A smooth bore 470 is cut in the left leg 472. The smooth bore 470 includes a shoulder 471. A threaded bore 473 is cut in the right leg 474. The allen head screw 441 passes through the smooth hole 470 and the left leg 472 and threadably engages the right leg 474. When the allen head screw 441 bottoms against the shoulder 471 and threadably engages the right leg 474, it mechanically squeezes the left leg 472 closer to the right leg 474. This reduces the interior diameter of the bore 464 which creates a mechanical grip between the second cable connector 440 and the rear connector tube 400.

FIG. 15A is a top plan view of the rear connector 40 with the cover 476 removed. In this view, the second cable connector assembly 600 has been rotated 90° from the position shown in FIG. 15. For manufacturing purposes, Applicants recommend that the apparatus be position as shown in FIG. 15A.

Figure 16:
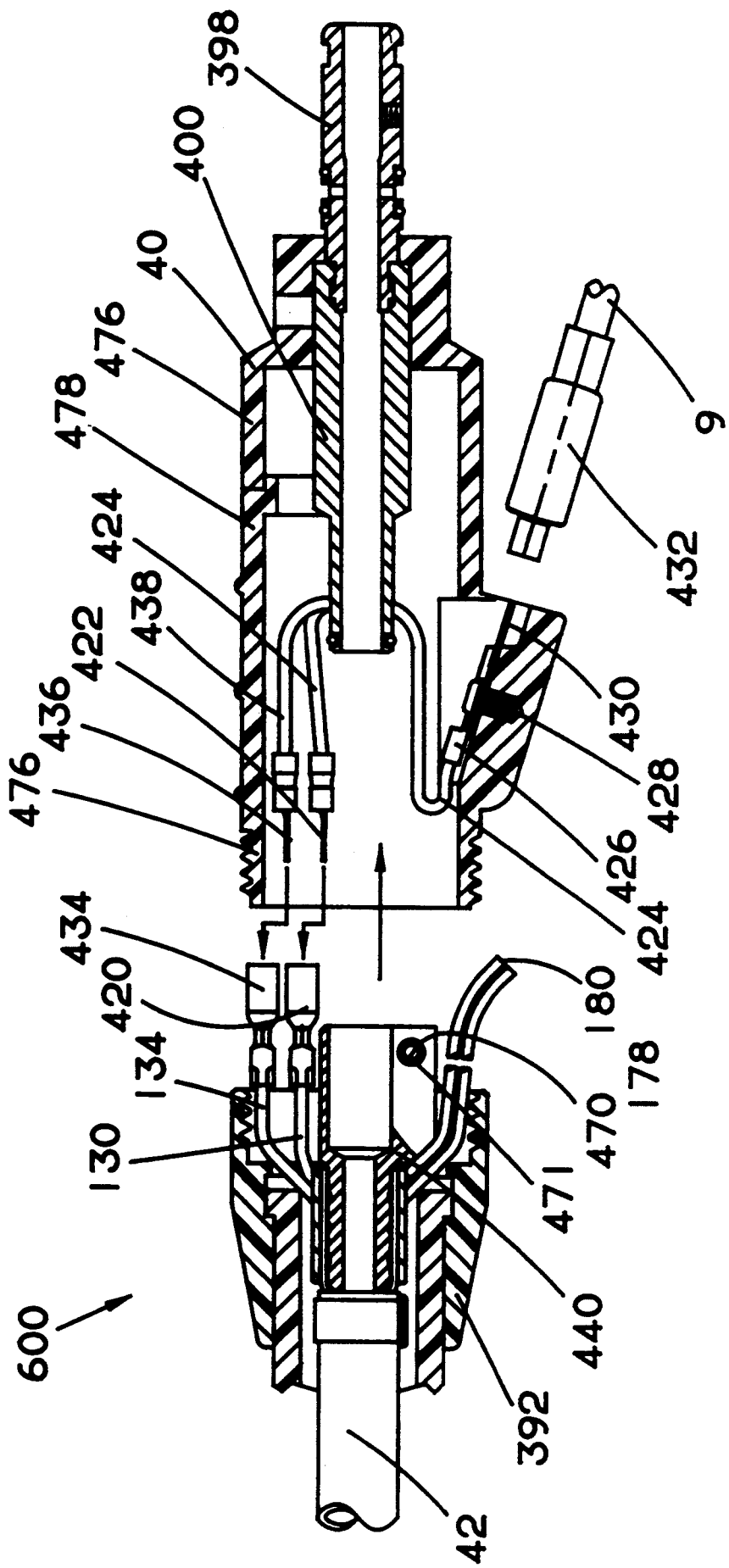
FIG. 16 is a section view similar to FIG. 15 showing the rear connector disconnected from the second cable connector assembly.

To disconnect the second cable connector assembly 600 from the rear connector 40, the operator must first unscrew the sleeve 392 and slip the strain relief 390 and the sleeve 392 back over the cable 42 as shown in FIG. 15A. The cover 476 can then be removed from the rear connector 40. After the cover 476 has been removed, the operator inserts an allen wrench in the allen head screw 441 and untightens it. The second cable connector 440 can then be slipped off the connector tube 400. The operator then disconnects the female terminal 420 from the male terminal 422. Finally the operator disconnects the female terminal 434 from the male terminal 436. The rear connector 40 is then completely disconnected from the second cable connector assembly 600, as shown in FIG. 16. To reconnect the second cable connector assembly 600, the operator repeats the above steps in reverse order.

FIG. 16 shows the rear connector 40 disconnected from the second cable connector assembly 600. The only tool that is required to disconnect the second cable connector assembly 600 from the rear connector 40 is an allen head wrench. A removable cover 476 forms the top of the rear connector 40. When the sleeve 392 is discontinued, the cover 476 comes off the rear connector 40 exposing the allen head screw in the second cable connector 440. The operator places the allen head wrench through the opening created by removal of the cover 476 to untighten the allen head screw in the second cable connector 440. When the screw is untightened the left leg 472 and the right leg 474 of the second cable connector 440 relax and release the mechanical grip on the rear connector tube 400. The operator then separates the second cable connector assembly 600 from the rear connector 40. The operator then separates the female terminal 434 from the male terminal 436 thus disconnecting the control wires 134 in the coaxial cable 42 from the control wire 438 in the rear connector 40. Likewise the operator separates the female connector 420 and the male connector 422 thus disconnecting the control wire 130 in the coaxial welding cable 42 from the control wire 424 in the rear connector 40. This completely disengages the second cable connector assembly 600 from the rear connector 40. To reattach the second cable connector assembly 600 and the rear connector 40 the operator merely repeats these steps in reverse. Again, the first cable connector assembly 238 has a similar configuration so that it will likewise mate with the rear connector 40. The second cable connector assembly 600 can also connect to the welding gun 1.

Additional control wires 178 and 180 also run the length of the coaxial welding cable 42 and will be discussed in greater depth with regard to FIG. 21.

Figure 17:
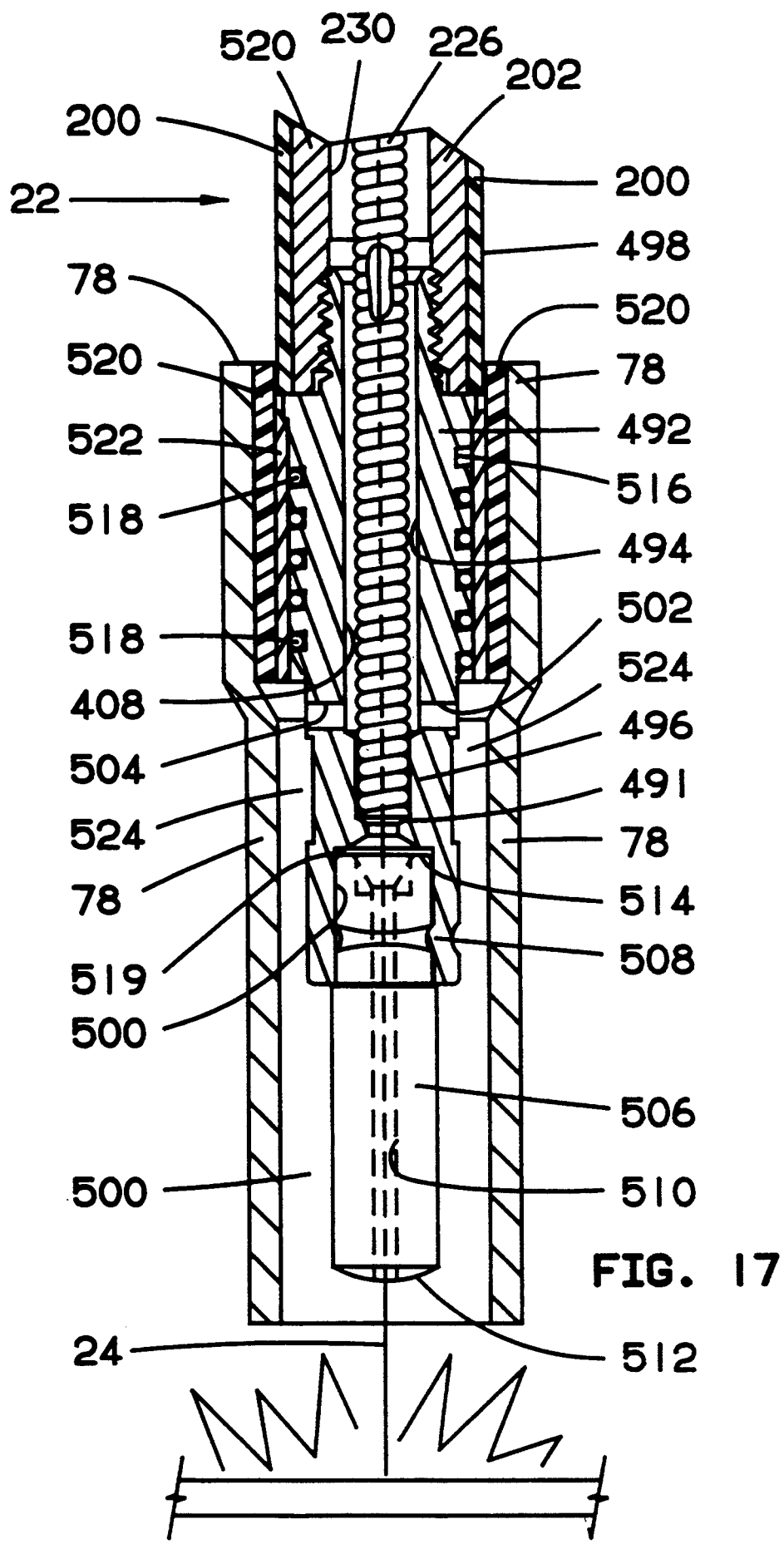
FIG. 17 is a section view showing a portion of the conductor tube assembly. This view shows the welding gun in operation with all components in place and welding wire feeding through the contact tip and engaging the workpiece.

FIG. 17 is an enlarged section view of the nozzle 78 and the second end 488 of the conductor tube 72. A gas diffuser 492 threadably engages the second end 488 of the conductor tube 72. A central bore 494 is positioned along the longitudinal axis of the diffuser 492. An interior shoulder 496 protrudes into the central bore 494 thus defining an upper interior chamber 498 and a lower interior chamber 500. The central bore 494 passes through the interior chamber 496 allowing communication between the upper interior chamber 498 and the lower interior chamber 500. A first gas passageway 502 and a second gas passageway 504 are formed in the diffuser 492. This plurality of gas passageways allows shielding gas to pass from the upper interior chamber 498 to the exterior of the gas diffuser 494 into the annular area 524.

A contact tip 506 is sized and arranged to fit inside the lower interior chamber 500 of the gas diffuser 492. A dimple or protrusion 508 extends into the lower interior chamber 500 of the gas diffuser 492. The contact tip 506 has a longitudinal bore 510 running from the front end 512 to the rear end 514 of the contact tip 506. The longitudinal bore 510 is relatively narrow and can vary in size depending on the diameter of welding wire 24 which is being used for a particular job.

The conductor tube 72 includes an outer insulating surface 200 and a rigid interior tube 202 which is conductive. An annular area 230 runs the entire length of the conductor tube 72. The welding wire feed tube 226 runs the length of the annular area 230 in the conductor tube 72 and bottoms at a shoulder 491 in the diffuser 492. The welding wire 24 passes through the welding wire feed tube 226 and the longitudinal bore 510 of the contact tip 506 exiting the welding gun as shown in this figure.

A spiral channel 516 is cut in the exterior surface of the diffuser 492. A spiral spring 518 is sized and arranged to fit in the channel 516. On the rear end of the nozzle 78 is an interior insulator 520 and an interior collar 522. The collar 522 is sized and arranged to fit over the diffuser and to rub against the spring 518 creating a mechanical grip between the nozzle 78 and the gas diffuser 492. The nozzle 78 can be easily slipped on and off of the diffuser 492 without the need of tools.

The shielding gas flows through the annular area 230 between the welding wire feed tube 226 and the rigid interior tube 202. The gas enters the longitudinal bore 494 of the diffuser 492, passes through the upper interior chamber 498 and exits through the gas passageways 502 and 504 into the annular area 524 formed between the interior diameter of the nozzle 78 and the exterior diameter of the diffuser 492. The gas then moves down the annular area 502 and exits the nozzle forming a shielding blanket around the welding wire 24 isolating the arc from atmospheric contamination.

A spring, not shown on the drawings, may be placed in the gap 519 between the rear portion 514 of the contact tip 506 and the interior chamber 500. This spring will exert force against the contact tip 506 helping to hold it in place.

The present diffuser is about 2½ inches (6.3 cm) long and weighs about 2¼ ounces (64 grams). Prior art diffusers sold by Tweco Products weighed approximately ½ ounce (14 grams).

Figure 18:
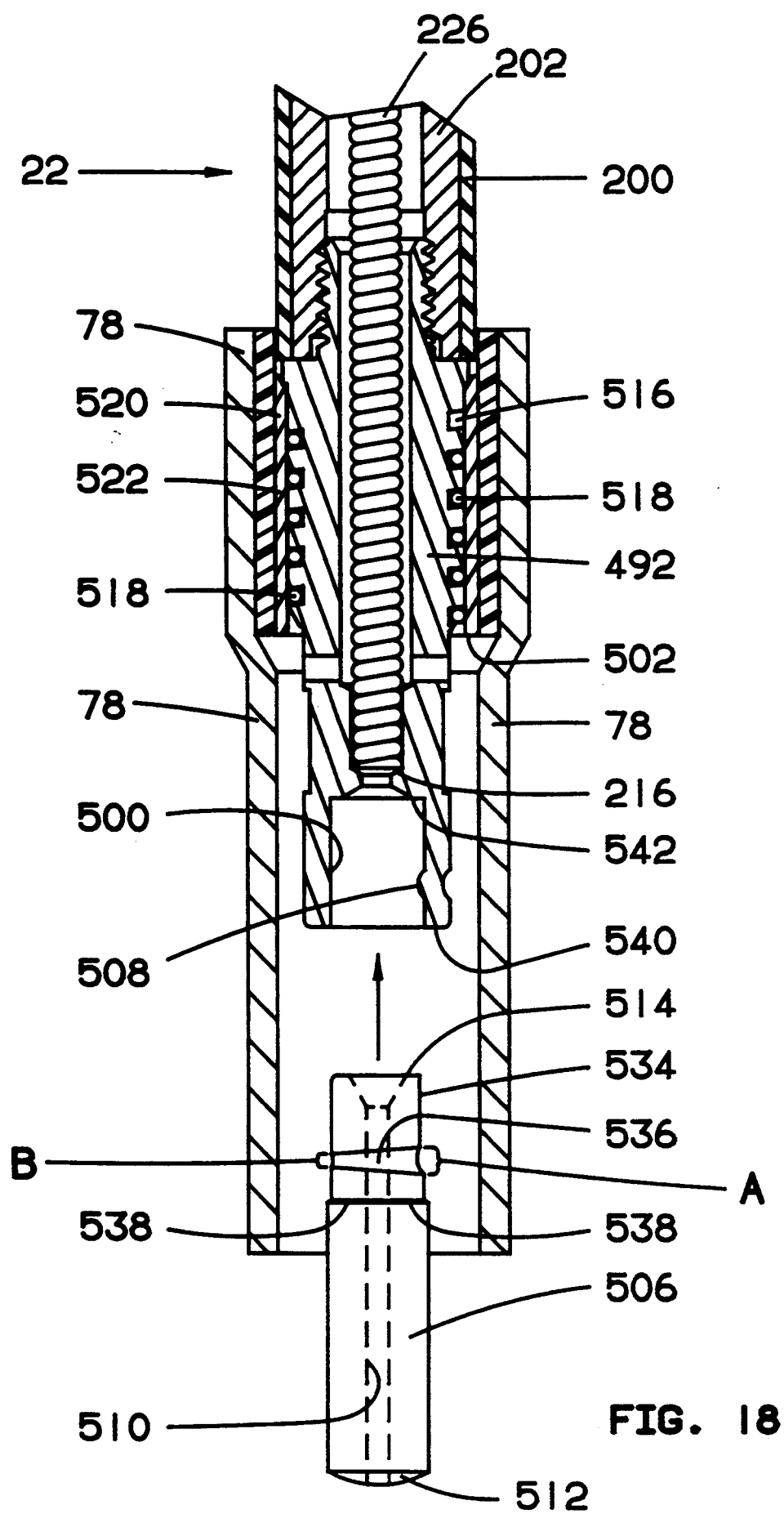
FIG. 18 is a section view similar to FIG. 17 except the contact tip has been disconnected and removed from the gas diffuser.

FIG. 18 is a section view showing a portion of the conductor tube 72, the nozzle 78, the gas diffuser 492 and the contact tip 506 which has been removed from the gas diffuser 492. Those skilled in the art recognize that it is desirable to have a threadless contact tip so that it can be easily removed from the gas diffuser. Weld spatter will sometimes interfere with threads and make removal difficult if not impossible. The contact tip 506 has a flat surface 534 formed near the rear portion 514 thereof. The purpose of the flat surface 534 is to allow the contact tip 506 to freely slip into the lower interior chamber 500 and bypass the protrusion 508. A channel 536 is cut in the circumference of the contact tip 506 to engage the protrusion 508. A circumferential shoulder 538 is cut in the contact tip near the rear portion 514. The shoulder 538 engages the front end 540 of the diffuser 492 when the contact tip 506 is inserted in the diffuser 492.

The contact tip 506 makes physical contact with the diffuser 492 in at least three locations which improves the transmission of electricity and the dissipation of heat. The first area of contact is between the protrusion 508 and the channel 536. The second area of contact is between the circumferential shoulder 538 and the front portion 540 of the diffuser 492. The third area of contact is a line opposite the protrusion 508 formed by the line of contact between the lower interior chamber 500 and an outer portion of the contact tip 506. This line of contact runs along the outer edge of the contact tip 506 from the shoulder 538 to the rear portion 514.

Figure 19:
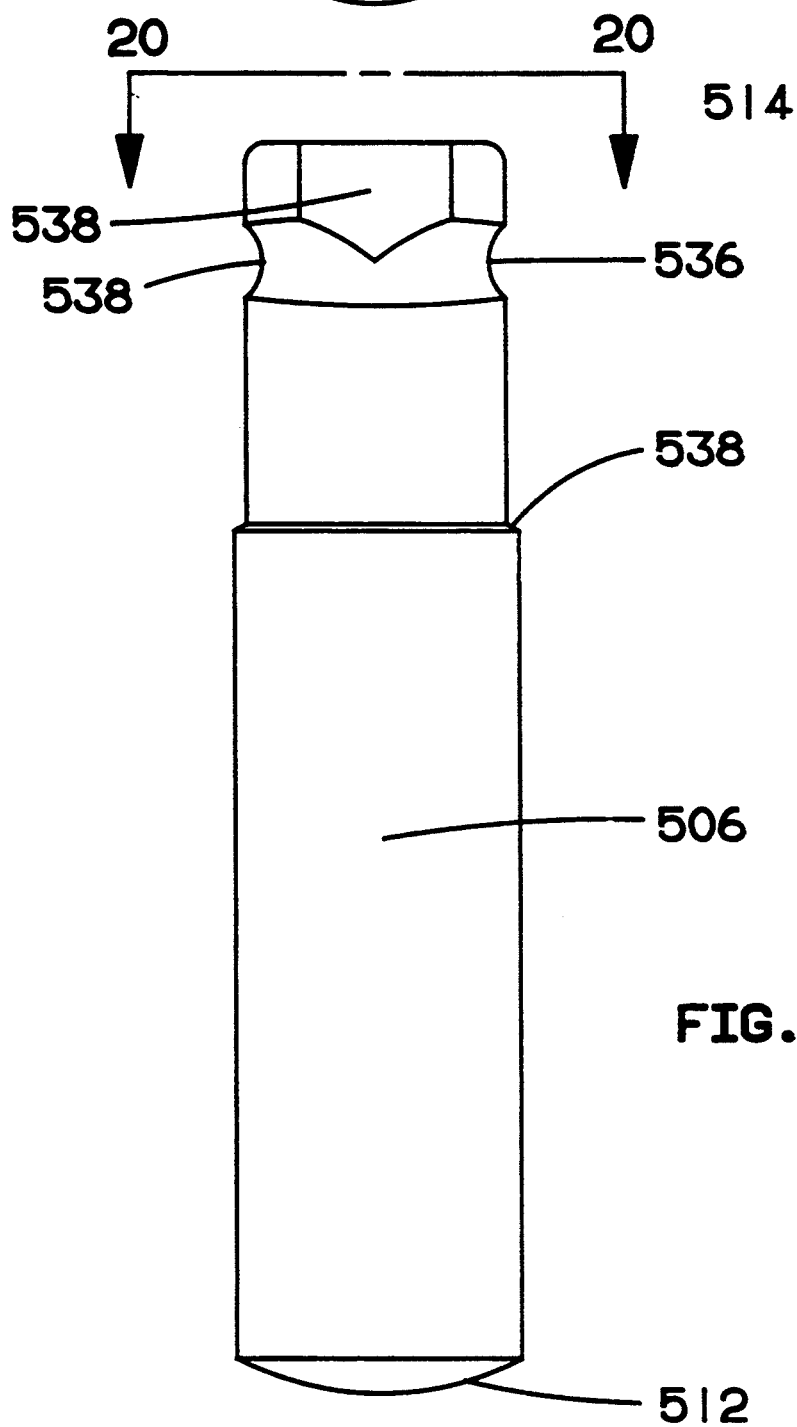
FIG. 19 is an enlarged side evaluation view of the contact tip.

FIG. 19 is an enlarged elevation view of the contact tip 506. The front end 512 is slightly rounded and the rear portion 514 is flat. The shoulder 538 is cut along the full circumference of the contact tip 506 near the rear portion 514. Applicants have successfully used a shoulder which is approximately 3/10 inch (0.8 cm) wide. A flat surface 534 is cut on the contact tip 506 near the rear portion 514 to allow the entire tip to slip freely in and out of the lower interior chamber 500 past the protrusion 508. The flat surface 534 is tangential to the generally cylindrical tip 506. The channel 536, which is formed in the contact tip 506 near the rear portion 514, must be sized and arranged to receive the protrusion 508. To insert the contact tip 506 into the gas diffuser 492 the flat surface 534 must be aligned with the protrusion 508. The contact tip 506 will then freely slip into the lower interior chamber 500. The protrusion 508 should be aligned with the channel 536. The contact tip is then twisted approximately ¼ of a revolution which wedges the protrusion 508 into the channel 536 and forces the contact tip 506 against the opposite side of the lower interior chamber 500 as well as drawing shoulder 538 in contact with the front end 540 of gas diffuser 492.

The channel 536 has a maximum width which is shown by the bracket A in FIG. 18 and tapers to a minimum width which is identified by the bracket B in FIG. 18.

The shape of the channel 536 and the protrusion 508 are not particularly significant. Those skilled in the art will recognize that other types of protrusions and channels will function in an equivalent fashion. Applicants have successfully used a contact tip 506 which weighs approximately ½ ounce (14 grams). The tip is approximately 1½" long (3.8 cm) and has an outside diameter of approximately ⅜ inch (1.0 cm). The aforementioned contact tip 506 is approximately twice as heavy as prior art tips used by Tweco Products, Inc. Applicants believe that the increased mass of the tip together with the improved three points of contact described above, allow the present tip 506 to operate at cooler temperatures than prior art tips manufactured by Tweco Products, Inc. Applicants believe that the present contact tip 506 has an enhanced usable life because it is believed to operate at cooler temperatures.

Figure 20:
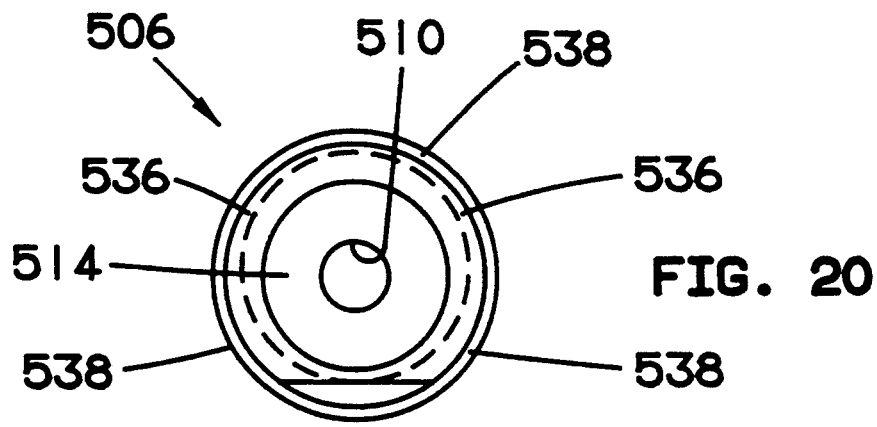
FIG. 20 is a top plan view of the contact tip along the line 20—20 of FIG. 19.

FIG. 20 is a top plan view of the contact tip 506 along the line 20—20 of FIG. 19. The central bore 510 runs from the rear portion 514 to the front portion 512 of the contact tip 506. The size of the longitudinal bore 510 is determined and varies according to the size of welding wire being used for a given project.

The flat surface 534 is cut on a tangent to the centerline and allows the contact tip 506 to freely pass by the protrusion 508. Those skilled in the art will recognize that other designs would be suitable to allow the contact tip to pass the protrusion 508 and to allow the protrusion 508 to engage the channel 536. The shoulder 538 is relatively narrow but it protects the lower interior chamber 500 from spatter thus making the tip easier to remove when it is time to be replaced. The channel 536 is shown in phantom. The channel achieves its maximum depth at a point where it contacts the flat 534 and achieves it minimum depth directly opposite the flat.

FIG. 21 shows an alternative embodiment of the welding gun handle 64. In this alternative embodiment an auxiliary switch 550 is added to the front portion 68 of the handle 64 in addition to the conventional trigger switch 108 which is shown in the bottom of the gun. The apparatus shown in FIG. 21 is identical in all respects to the previous figures except the front portion 68 of the handle 64 is modified to receive an auxiliary switch 550.

An interior chamber 552 is defined by a sidewall 554 and a top wall 556. The auxiliary switch 550 can be used for various purposes depending on the desire of the operator and the configuration of the welding power source 10. In one embodiment, the auxiliary switch 550 could be a toggle switch with three positions. Each of the three positions could interface with the circuitry in the welding power source to adjust the amperage from high, to low, to a medium predetermined setting as the welder moves from one project to another.

In an alternative embodiment, the auxiliary switch 550 could be used for actuation of the welding power source 10 in addition to the conventional trigger switch 108. This would allow the operator to actuate the welding gun 1 with his thumb so that he could rest his trigger finger. The auxiliary switch 550 connects to a first wire 558 and a second wire 560. The first wire 558 connects to a male terminal 562 and the second wire 560 connects to another male terminal 564. The male terminals 562 and 564 releasibly connect to female terminals, not shown, which connect to control wires 178 and 180 which are a part of the first cable connector assembly 238 as better seen in FIG. 14. Additional control wires can be furnished in the rear connector 40 to releasibly connect to the control wires 178 and 180 in the second cable connector assembly 600 shown in FIG. 16. The additional control wires 178 and 180 eventually interface with additional electrical circuitry in the welding power source 10 as discussed hereinabove.

FIG. 22 is a graph of temperature versus hardness for the copper alloy that Applicants have successfully used in the present contact tip 506. The alloy consists of approximately 99.9 percent copper and 0.02 percent phosphorus. Prior art contact tips manufactured by Tweco Products, Inc. had an average operating temperature of approximately 1475° F. (800° C.). The present contact tip 506 is believed to have an average operating temperature of 875° F. (470° C.) which is substantially cooler than the afore-mentioned prior art tips. This chart indicates the general relationship between temperature and hardness for this copper alloy. Generally speaking the cooper alloy tends to get softer as temperature increases. The continuous welding wire feeds through the interior bore of the tip and wears it out. Applicants believe that the present contact tip 506 runs cooler and therefore has enhanced wear properties when compared with the aforementioned prior art contact tips. Applicants believe that the cooler operating temperatures are a result of increased mass and improved contact between the diffuser 492 and the contact tip 506.

While the foregoing is directed to the preferred embodiment of the present invention, other and further embodiments of the invention may be devised without departing from the basic scope thereof, and the scope thereof is determined by the claims which follow.

What is claimed:

1. A welding system including a conventional elongate coaxial cable connected on one end to an air cooled MIG welding gun and on the other end to a rear connector, the combination being connected to a conventional power source which provides inert shielding gas, continuous welding wire and electricity which is conveyed through the rear connector, through the conventional coaxial welding cable to the MIG welding gun, the welding cable having an exterior tubular layer of insulation, a hollow tubular layer of copper stranding underneath the layer of exterior insulation, a hollow gas hose positioned inside the hollow tubular layer of copper stranding, a welding wire feed tube positioned inside the hollow gas hose and control wires positioned underneath the exterior insulation and running the length of the elongate coaxial welding cable, the welding system comprising in combination:

a. a quick disconnect cable assembly for releasably connecting one end of a conventional elongate coaxial welding cable to said MIG welding gun and for releasably connecting the other end of the cable to a rear connector, having:

1) a first interchangeable cable connector attached to one end of the elongate coaxial welding cable, said first interchangeable cable connector having an elongate central bore for conveying the shielding gas and the continuous welding wire, said first interchangeable cable connector including an elongate extension having two tubular segments, the first tubular segment sized and arranged to engage the interior of the gas hose and the second tubular segment having a larger diameter than said first segment and sized and arranged to engage the interior of the tubular layer of copper stranding;

2) first means for connecting the copper stranding to said second tubular segment of said extension of said first interchangeable cable connector;

3) first means for releasably attaching said first interchangeable cable connector and the coaxial welding cable to said welding gun or the rear connector, said attachment being accomplished without having to completely disassemble said MIG welding gun or the rear connector;

4) first means for releasably attaching the control wires to complimentary control wires in said MIG welding gun or the rear connector;

5) first means for providing a gas seal between said elongate central bore of said first interchangeable cable connector and said MIG welding gun or said rear connector;

6) a second interchangeable cable connector attached to the other end of the elongate coaxial welding cable, said first interchangeable cable connector having an elongate central bore for conveying the shielding gas and the continuous welding wire, said second interchangeable cable connector including an elongate extension having two tubular segments, the first tubular segment sized and arranged to engage the interior of the gas hose and the second tubular segment having a larger diameter than the first segment and sized and arranged to engage the interior of the tubular layer of copper stranding;

7) second means for connecting the copper stranding to said second tubular segment of said extension of said second interchangeable cable connector;

8) second means for releasably attaching said second interchangeable cable connector and the coaxial welding cable to the rear connector on said MIG welding gun, said attachment being accomplished without having to completely disassemble the rear connector or said MIG welding gun;

9) second means for releasably attaching the control wires to complimentary control wires in the rear connector or said MIG welding gun;

10) second means for providing a gas seal between said elongate central bore of said second interchangeable cable connector and said MIG welding gun or the rear connector; and 11) said first interchangeable cable connector and said second interchangeable cable connector being substantially the same so said first interchangeable cable connector can also be attached to either said MIG welding gun or the rear connector and said second interchangeable cable connector can also be attached to either said MIG welding gun or to the rear connector to allow the ends of the cable to be switched between said MIG welding gun and the rear connector without having to completely disassemble either said MIG welding gun or the rear connector;

b. said MIG welding gun having:

1) a conductor tube assembly including:

a) a rigid elongate hollow conductor tube for conveying shielding gas and continuous welding wire, said conductor tube having a first end and a second end;

b) said first end of said conductor tube having a ball-shaped protrusion formed on the terminus thereof;

c) a gas diffuser threadably engaging said second end of said conductor tube, said gas diffuser including:

i) an upper interior chamber and a lower interior chamber divided by an interior shoulder with a central bore passing through said interior shoulder, said bore allowing communication between said upper chamber and said lower chamber;

ii) a plurality of gas passageways in said gas diffuser allowing shielding gas to pass from said upper interior chamber to the exterior of said gas diffuser to form a shielding blanket of inert gas about the welding wire; and iii) a protrusion extending into the lower chamber of said gas diffuser;

d) an elongate contact tip being generally cylindrical in shape with a central bore running from the first end to the second end for the passage of continuous welding wire, said contact tip including:

i) a tangential flat surface formed on said first end of said contact tip allowing said contact tip to freely slip into said lower chamber of said gas diffuser, avoiding said protrusion;

ii) a channel cut in the outer circumference of said contact tip through said flat surface, said channel receiving said protrusion when said contact tip is rotated in said lower chamber of said gas diffuser, removably wedging said contact tip in place in said diffuser;

iii) a circumferential shoulder formed on said contact tip near said first end to contact said gas diffuser for improved transmission of electricity and heat through said gas diffuser and said contact tip; and 2) a handle assembly including:

a) a hollow handle having an oval shaped upper surface and a protruding rectangular shaped lower surface, the handle having a gentle downward bend in the rear portion of approximately 10° or more from the longitudinal axis to facilitate grasping of said handle by the operator;

b) an elongate trigger pivotally attached to said handle for actuating the power source to provide shielding gas, continuous welding wire and electricity to said MIG welding gun;

c) a connector block positioned inside said handle having a spherical socket formed in the front end thereof, said socket sized and arranged to receive said ball-shaped protrusion of said conductor tube, said connector block having a central bore in communication with said spherical socket for conveying shielding gas and welding wire; and d) means for applying pressure to said ball-shaped protrusion and said connector block to allow said conductor tube to rotate 360° about the centerline of said handle and to articulate approximately 15° or more in a conical area extending from said front end of said connector block.

2. A quick disconnect cable assembly for releasibly connecting one end of a conventional elongate coaxial welding cable to a rear connector and for releasibly connecting the other end to a welding gun, the rear connector being connected to a welding power source which provides shielding gas, continuous welding wire, and electricity, all of which pass through the rear connector and the coaxial welding cable to the welding gun, the welding cable having an exterior tubular layer of insulation, a hollow tubular layer of copper stranding underneath the layer of exterior insulation, a gas hose positioned inside the hollow tubular layer of copper stranding, and control wires positioned underneath the exterior insulation and running the length of the elongate coaxial welding cable, said quick disconnect cable assembly comprising:

a. a first interchangeable cable connector having an elongate central bore for conveying the shielding gas and the continuous welding wire, said first interchangeable cable connector including an inverted U-shaped grip with a screw to adjust the tension of said grip for releasibly attaching said first interchangeable cable connector and the b. first means for connecting the copper stranding to said first interchangeable cable connector;

c. first means for releasably attaching the control wires to complimentary control wires in the MIG welding gun;

d. a second interchangeable cable connector having an elongate central bore for conveying the shielding gas and the continuous welding wire, said second interchangeable cable connector including an inverted U-shaped grip with a screw to adjust the tension of said grip for releasibly attaching said first interchangeable cable connector and the coaxial welding cable to the rear connector;

e. second means for connecting the copper stranding to said second interchangeable cable connector;

f. second means for releasably attaching the control wires to complimentary control wires in the rear connector; and g. said first interchangeable cable connector and said second interchangeable cable connector being substantially the same as said first interchangeable cable connector can also be attached to the rear connector and said second interchangeable cable connector can also be attached to the MIG welding gun to allow the ends of the cable to be switched between said welding gun and the rear connector.

3. A MIG welding gun assembly comprising:

a. an adjustable elongate hollow conductor tube for conveying shielding gas and continuous welding wire, said adjustable conductor tube having a first end and a second end;

b. said first end of said adjustable conductor tube having a ball-shaped protrusion formed on the terminus thereof;

c. a connector block having a spherical socket formed in a front end thereof, said socket sized and arranged to receive said ball-shaped protrusion of said adjustable conductor tube, said connector block having a central bore in fluid communication with said spherical socket for conveying shielding gas and welding wire; and d. a retainer assembly that applies pressure to said ball-shaped protrusion, said retainer assembly including;

i. a collet threadably engaging said connector block and axially extending therefrom, said collet encircling said adjustable conductor tube;

ii. a stop disposed on one end of said collet opposite said connector block, said collet, said stop, and said adjustable conductor tube together defining an annular cavity therebetween; and iii. at least one spring disposed in said cavity and encircling said adjustable conductor tube;

e. said retainer assembly cooperating with said ball-shaped protrusion and said connector block to form a ball and socket joint and to allow said adjustable conductor tube to rotate 360° about a longitudinal axis of said connector block and to articulate in a conical area extending from said front end of said connector block.

4. A MIG welding gun assembly comprising:
 a. an adjustable elongate hollow conductor tube for conveying shielding gas and continuous welding wire, said adjustable conductor tube having a first end and a second end;
 b. said first end of said adjustable conductor tube having a ball-shaped protrusion formed on the terminus thereof;
 c. a connector block having a spherical socket formed in the front end thereof, said socket sized and arranged to receive said ball-shaped protrusion of said adjustable conductor tube, said connector block having a central bore in fluid communication with said spherical socket for conveying shielding gas and welding wire; and
 d. means for applying pressure to said ball shaped protrusion and said connector block to form a ball and socket joint and to allow said adjustable conductor tube to rotate 360° about the longitudinal axis of said connector block and to articulate in a conical area extending from said front end of said connector block, said means for applying pressure to said ball shaped protrusion and said connector block including;
  i. a nut defining a central bore having internal threads on one end of said bore and a recessed channel on the opposite end, said threads engaging the front end of said connector block;
  ii. a snap ring removably positioned in said channel, said snap ring having a central aperture surrounding a portion of said conductor tube;
  iii. a first flat washer positioned in said channel behind said snap ring, said first washer having a central aperture surrounding a portion of said conductor tube;
  iv. a first wave washer positioned in said channel behind said first flat washer, said first wave washer having a central aperture surrounding a portion of said conductor tube;
  v. a second flat washer positioned in said channel behind said first wave washer, said second flat washer having a central aperture surrounding a portion of said conductor tube;
  vi. a second wave washer positioned in said channel behind second flat washer, said second wave washer having a central aperture surrounding a portion of said conductor tube; and
  vii. a follower positioned in said channel behind said second wave washer, said follower being urged into contact with said ball-shaped protrusion by said first and said second wave washers and holding said ball-shaped protrusion in said spherical socket.

5. The welding gun of claim 4 further including an elongate trigger which can be actuated from both said front portion of said handle and said rear portion of said handle.

6. The welding gun of claim 4 further including a handle having a front portion and a rear portion, said rear portion curving downward approximately 10° from the centerline of said handle to facilitate gripping by the welder.

7. The welding gun of claim 6 further including an oval shaped upper surface on said handle and a protruding rectangular shaped lower surface on said handle to facilitate gripping by the welder.

8. A welding gun assembly comprising:
 a. an adjustable elongate hollow conductor tube for conveying shielding gas and continuous welding wire, said adjustable conductor tube having a first end and a second end;
 b. said first end of said adjustable conductor tube having a ball-shaped protrusion formed on the terminus thereof;
 c. a connector block having a spherical socket formed in the front end thereof, said socket sized and arranged to receive said ball-shaped protrusion of said adjustable conductor tube, said connector block having a central bore in fluid communication with said spherical socket for conveying shielding gas and welding wire; and
 d. means for applying pressure to said ball shaped protrusion and said connector block to form a ball and socket joint and to allow said adjustable conductor tube to rotate 360° about the longitudinal axis of said connector block and to articulate at least 10° in a conical area extending from said front end of said connector block.
 e. a gas diffuser defining an upper and lower interior chamber divided by an interior shoulder with a central bore passing through said interior shoulder including:
  i. a plurality of gas passageways in said gas diffuser allowing shielding gas to pass from said upper interior chamber to the exterior of said gas diffuser;
  ii. a protrusion extending into the lower chamber of said gas diffuser to engage and removably connect said contact tip;
  iii. said elongate contact tip being generally cylindrical in shape with a central bore running from the first end to the second end for the passage of continuous welding wire;
  iv. a tangential flat surface formed on said first end of said contact tip allowing said contact tip to freely slip into said lower chamber of said gas diffuser, avoiding said protrusion; and
  v. a channel cut in the outer circumference of said contact tip through said flat surface, said channel receiving said protrusion when said contact tip is rotated in said lower interior chamber of said gas diffuser, wedging said contact tip in place in said diffuser for operation of the MIG welding gun; and
 f. an elongate contact tip having a generally cylindrical body having a front and rear end including:
  i. a longitudinal bore in said body from said front to said rear end for the passage of continuous welding wire;
  ii. a circumferential shoulder formed in said body near the rear end;
  iii. a tangential flat formed on said rear end of said body; and
  iv. a circumferential channel formed near said rear end of said body for releasibly attaching said contact tip in said MIG welding gun.

9. A MIG welding gun assembly comprising:
 a. a continuous welding wire;
 b. an elongate hollow conductor tube adapted to convey shielding gas and said continuous welding wire, said elongate hollow conductor tube having a first end and a second end;

c. said first end of said elongate hollow conductor tube having a ball-shaped protrusion formed on the terminus thereof;

d. a connector block having a spherical socket formed in a front end thereof, said spherical socket configured to receive said ball-shaped protrusion of said elongate hollow conductor tube, said connector block having a central bore in fluid communication with said spherical socket for conveying shielding gas and said welding wire; and e. a retainer assembly that applies pressure to said ball-shaped protrusion to resiliently urge said ball-shaped protrusion against said connector block to form a ball and socket joint and to allow said elongate hollow conductor tube to rotate 360° about a longitudinal axis of said connector block and to articulate in a conical area extending from said front end of said connector block, said ball-shaped protrusion and said connector block cooperating such that during articulation of said elongate hollow conductor tube said welding wire and the shielding gas are freely conveyed.

10. The welding gun assembly of claim 9, wherein said retainer assembly comprises:

a. a collet received about said connector block and axially extending therefrom along an axis defined by said elongate hollow conductor tube;

b. a retainer ring disposed on one end of said collet opposite said connector block, said collet ring and elongate hollow conductor tube together defining an annular chamber; and c. a plurality of wave springs disposed in said annular chamber, a first wave spring of said plurality of wave springs abutting said ring, and a last wave spring of said plurality of wave springs abutting said ball-shaped protrusion.

11. A MIG welding gun assembly comprising:

a. a continuous welding wire;

b. an elongate hollow conductor tube that conveys a shielding gas and said continuous welding wire, said elongate hollow conductor tube having a first end and a second end;

c. said first end of said elongate hollow conductor tube having a ball-shaped member on the terminus thereof;

d. a connector block having a spherical socket formed in a front end thereof adapted to receive said ball-shaped member, said connector block having a bore in fluid communication with said spherical socket to convey the shielding gas and said welding wire; and e. a biasing assembly that maintains said ball-shaped member in said spherical socket of said connector block to form a ball and socket joint and to allow said elongate hollow conductor tube to rotate 360° about a longitudinal axis of said connector block and to articulate 30° or less in a conical area extending from said front end of said connector block, said ball-shaped member and said connector block cooperating such that during articulation said welding wire and the shielding gas are freely conveyed.

12. A MIG welding gun assembly comprising:

a. an adjustable elongate hollow conductor tube for conveying shielding gas and continuous welding wire, said adjustable conductor tube having a first end and a second end;

b. said first end of said adjustable conductor tube having a ball-shaped protrusion formed on the terminus thereof;

c. a connector block having a spherical socket found in the front end thereof, said socket sized and arranged to receive said ball-shaped protrusion of said adjustable conductor tube, said connector block having a central bore in fluid communication with said spherical socket for conveying shielding gas and welding wire;

d. a retainer assembly encircling said conductor tube and applying pressure to said ball-shaped protrusion to form a ball and socket joint and to allow said adjustable conductor tube to rotate 360° about the longitudinal axis of said connector block and to articulate 30° or less in a conical area extending from said front end of said connector block; and e. a handle assembly including:

i) a hollow handle having a gentle downward bend in the rear portion of approximately 10° or more from the longitudinal axis to facilitate grasping of said handle by the operator; and ii) an elongate trigger pivotally attached to said handle for activating the power source to provide shielding gas, continuous welding wire and electricity to said MIG welding gun.

* * * * *